US012524569B2

(12) United States Patent
Cai et al.

(10) Patent No.: US 12,524,569 B2
(45) Date of Patent: Jan. 13, 2026

(54) DYNAMICALLY UPDATING CLASSIFIER PRIORITY OF A CLASSIFIER MODEL IN DIGITAL DATA DISCOVERY

(71) Applicant: OneTrust LLC, Atlanta, GA (US)

(72) Inventors: Tianchen Cai, Milpitas, CA (US); Subramanian Viswanathan, San Ramon, CA (US)

(73) Assignee: OneTrust LLC, Atlanta, GA (US)

( * ) Notice: Subject to any disclaimer, the term of this patent is extended or adjusted under 35 U.S.C. 154(b) by 165 days.

(21) Appl. No.: 18/453,650

(22) Filed: Aug. 22, 2023

(65) Prior Publication Data

US 2024/0070319 A1 Feb. 29, 2024

Related U.S. Application Data

(60) Provisional application No. 63/400,741, filed on Aug. 24, 2022.

(51) Int. Cl.
*G06F 16/28* (2019.01)
*G06F 9/48* (2006.01)
*G06F 21/62* (2013.01)

(52) U.S. Cl.
CPC ........ *G06F 21/6245* (2013.01); *G06F 9/4881* (2013.01); *G06F 16/285* (2019.01)

(58) Field of Classification Search
None
See application file for complete search history.

(56) References Cited

U.S. PATENT DOCUMENTS 11,120,364 B1 * 9/2021 Gokalp ................. G06N 20/00
2021/0081837 A1 3/2021 Polleri et al.

OTHER PUBLICATIONS

International Search Report & Written Opinion as received in PCT/US2023/072695 dated Dec. 18, 2023.
Raphael Ducasse et al: "Adaptive Topoligic Optimization for Large-Scale Stream Mining", IEEE Journal of Selected Topics in Signal Processing, IEEE, US, vol. 4, No. 3, Jun. 1, 2020, pp. 620-636.
Xu Jie et al: "Learning optimal classifier chains for real-time big data mining", 2013 51st Annual Allerton Conference on Communication, Control, and Computing, IEEE, Oct. 2, 2013, pp. 512-519.

* cited by examiner

*Primary Examiner* — Cai Y Chen
(74) *Attorney, Agent, or Firm* — Ballard Spahr LLP

(57) ABSTRACT

Methods, systems, and non-transitory computer readable storage media are disclosed for updating the priority of classifiers in a classifier model. Specifically, the disclosed systems execute operations to extract data elements from a digital dataset. The disclosed system generates first classifier labels for a first subset of data elements (e.g., a test dataset) by utilizing a classification model to apply a predetermined order of classifiers to the first subset of data elements. The disclosed systems utilize the first classifier labels to determine a priority order for the classifiers for applying to a second subset of data elements the digital dataset. Using the determined priority order of the classifiers, the disclosed systems can generate second classifier labels for a second subset of data elements by utilizing the classifier model to apply the classifiers according to the priority order.

20 Claims, 12 Drawing Sheets

```
Data Element 1 502   →   Classifier Model 506      →   Labeled Data Element 1 512   First Confidence Score: 1.00  516
Data Element 2 504        1st Classifier 508           Labeled Data Element 2 514   Second Confidence Score: 0.70  518
```

Fig. 5

DYNAMICALLY UPDATING CLASSIFIER PRIORITY OF A CLASSIFIER MODEL IN DIGITAL DATA DISCOVERY

CROSS-REFERENCE TO RELATED APPLICATIONS

This application claims priority to and the benefit of U.S. Provisional Patent Application No. 63/400,741, filed on Aug. 24, 2022, which is incorporated herein by reference in its entirety.

BACKGROUND

Advances in computer processing and data storage technologies have led to a significant increase in the amount and types of data moved to digital environments for processing. Specifically, many entities utilize computing devices and/or software applications to store, analyze, and/or perform a number of computing operations on different types of data. Computing systems handling (e.g., collecting, receiving, transmitting, storing, processing, sharing, and/or the like) certain types of digital data are often subject to handling such data in connection with various internal or external data requirements, such as security, privacy, legal, or ethical requirements. In connection with handling digital data, entities often perform various operations on digital data, such as categorizing and/or labeling various data elements from digital datasets, for use in identifying data sources of specific digital data types or in downstream operations involving the digital data. Accordingly, entities that handle datasets with large amounts of complex data and computing systems utilize classification methods to categorize data elements for use in pattern recognition, information retrieval, security purposes, and/or verifying compliance with various internal or external data requirements.

As mentioned above, many entities must sift through, extract, and classify information (e.g., metadata, data elements, data features) from large and complex datasets before performing various processes on the data. Classifying such large datasets—sometimes petabytes of data—can consume a significant amount of computer processing power, storage space, and/or network bandwidth. In some cases, conventional systems waste computing resources, storage space, and network bandwidth by processing digital data in large quantities in sequence without considering the types of data. For example, some existing systems utilize inefficient classification methods that take several days to identify and categorize data elements from datasets.

Because conventional systems typically process large amounts of data in such a manner, such conventional systems often fail to efficiently process large amounts of data, causing issues with downstream operations. For example, in instances where classification consumes larger spans of time, sensitive information can be exposed to security risks (e.g., data breaches or other unauthorized access) by preventing the sensitive data from being accessible to downstream operations in a timely manner. Relatedly, such slow classification methods can make it difficult for systems with limited resources (e.g., computer processing capabilities or network bandwidth) to meet certain internal or external data requirements while classifying specific data types covered by those data requirements. For example, industries dealing with identity fraud must be able to quickly classify data elements and/or features so that they can detect fraud in real time or near real-time. Thus, some conventional systems typically use processes that fail to efficiently and securely classify data.

SUMMARY

This disclosure describes various aspects for dynamically updating the priority of classifiers in a classifier model during digital data discovery. For example, the disclosed systems execute operations to generate first classifier labels for a first subset of data elements (e.g., a test dataset) extracted from a digital dataset by utilizing a classification model to apply a predetermined order of classifiers to the first subset of data elements. The disclosed systems utilize the first classifier labels to determine a priority order for the classifiers for applying to additional data in the dataset. Using the updated priority order of the classifiers, the disclosed systems can generate second classifier labels for a second subset of data elements by utilizing the classifier model to apply the classifiers according to the priority order. In some aspects, the disclosed systems determine the priority order based on match rates between the classifiers and the first subset of data elements in the dataset. In some aspects, the disclosed systems determine one or more sub-classifiers associated with a classifier and determine an additional priority order for the sub-classifiers. By dynamically updating a priority order of classifiers to apply to a dataset utilizing an initial subset of data elements, the disclosed systems provide efficient classification of data for downstream operations.

BRIEF DESCRIPTION OF THE DRAWINGS

Various aspects will be described and explained with additional specificity and detail through the use of the accompanying drawings.

FIG. 5 illustrates an example of the classification priority management system generating confidence scores for a relationship between data elements and classifiers in accordance with one or more aspects.

DETAILED DESCRIPTION

Figure 1:
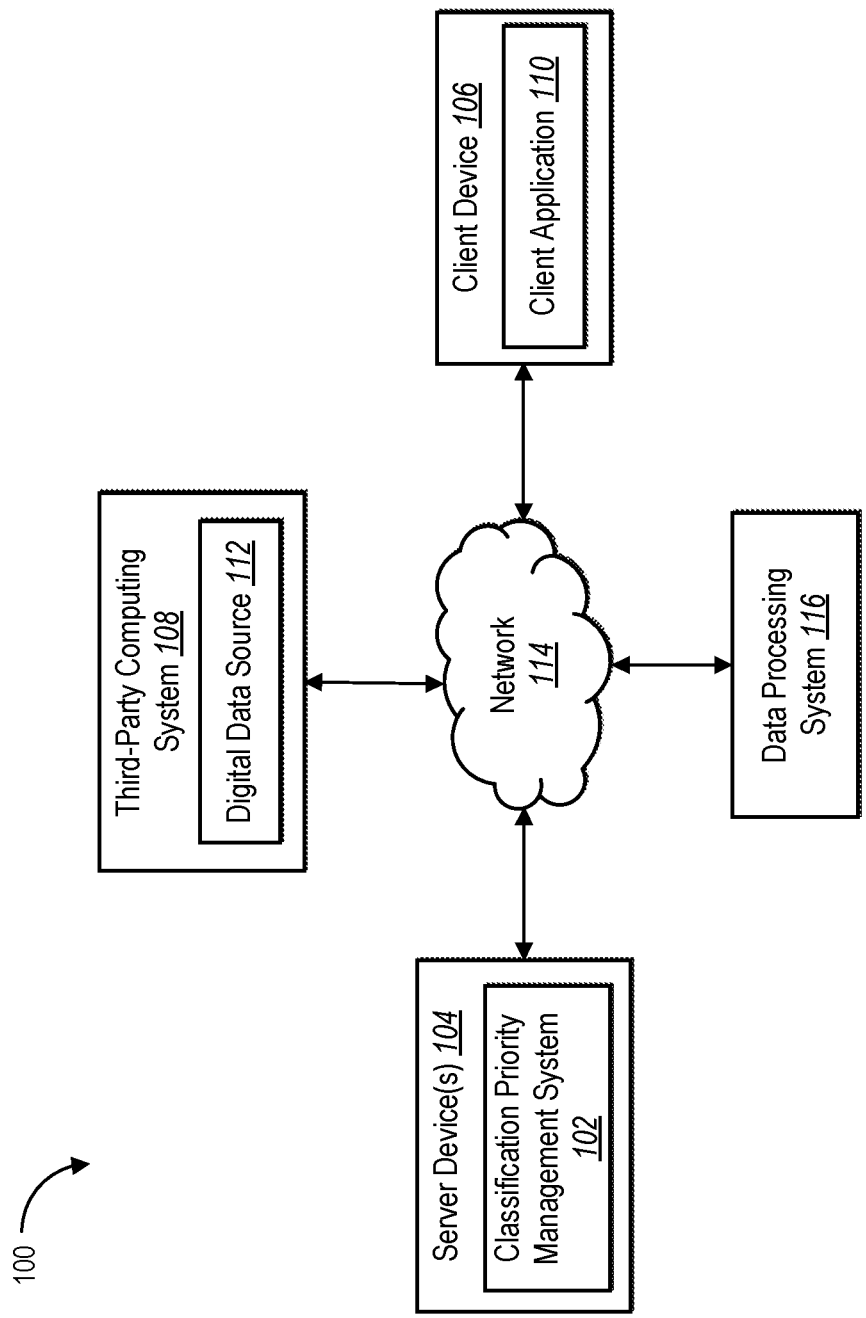
FIG. 1 illustrates an example of a system environment in which a classification priority management system can operate in accordance with one or more aspects.

This disclosure describes one or more aspects of a classification priority management system that generates classifier labels for data according to a dynamic priority order of classifiers. For example, the classification priority management system scans data to identify various attributes of the data (e.g., data elements, data features, metadata, etc.). More specifically, the classification priority management system utilizes a classifier model including a plurality of classifiers to label a first subset of data elements from a digital dataset by applying a predetermined order of the classifiers to the first subset of data elements. For instance, the classification priority management system can generate first classifier labels for the first subset of data elements. Furthermore, based on the first classifier labels, the classification priority management system can determine a priority order of the classifiers of the classifier model. The classification priority management system generates second classifier labels for a second subset of data elements from the digital dataset by applying the classifiers according to the priority order. Thus, the classification priority management system can more quickly and efficiently categorize specific types of digital data by prioritizing the application of classifiers of a classifier model to datasets.

In one or more aspects, the classification priority management system extracts data elements from a digital dataset stored at a digital data source. More specifically, the classification priority management system can extract data elements (e.g., digital content items or portions of digital content items) from the dataset. For example, the classification priority management system can extract a first subset of data elements (e.g., a first subset of digital content items or a test subset of digital content items) from the digital dataset.

According to one or more aspects, the classification priority management system utilizes a classifier model to generate classifier labels for data elements of the digital dataset. In particular, the classification priority management system can generate classifier labels for data elements by applying a predetermined order of classifiers of the classifier model to the data elements of the digital dataset to categorize the data elements into one or more categories corresponding to the classifiers. For instance, the classification priority management system can generate first classifier labels for the first subset of data elements according to the predetermined order of classifiers.

In one or more additional aspects, the classification priority management system utilizes the classifier labels for initial data to determine a priority order of the classifiers for classifying additional data. In particular, in response to generating the first classifier labels for the first subset of data elements, the classification priority management system determines a priority order of the classifiers of the classifier model, which may be different than the predetermined order of the classifiers. For example, in some aspects, the classification priority management system determines a priority order by assigning a higher priority to certain classifiers and/or lower priority to other classifiers. As mentioned previously, in one or more aspects, the classification priority management system determines the priority order of the classifiers based on label frequencies (e.g., match rates) generated by the classifier model on the first subset of data elements.

In some aspects, the classification priority management system generates second classifier labels for a second subset of digital elements from the digital data source by applying the priority order of classifiers to the second subset of data elements. For instance, the classification priority management system can extract a second subset of data elements from the digital dataset and apply classifiers of the classifier model to the second subset of data elements according to the priority order of the classifiers. Accordingly, the classification priority management system can dynamically rearrange the predetermined order of classifiers (e.g., generate the priority order of classifiers) by giving classifiers of the classifier model different priority levels based on application of the classifiers to initial data for use in applying to additional data. In some implementations, the classification priority management system can continue to update the priority order of classifiers based on scanning and/or extracting data elements from additional datasets.

In one or more aspects, the classification priority management system improves upon shortcomings of conventional systems in relation to classifying and processing digital data. Specifically, conventional systems lack efficiency and flexibility in categorizing digital data. For example, some conventional systems typically apply a single, predefined order of classifiers across a variety of datasets without regard to the content or context of data elements in the dataset. By utilizing a single, predefined order of classifiers, such conventional systems inefficiently consume computing resources by unnecessarily scanning through datasets multiple times while applying one or more classifiers that do not relate to large portions of data. To illustrate, some conventional systems waste storage space, network bandwidth, and computing resources by scanning through a dataset while applying a "name" classifier followed by rescanning the dataset while applying a "date of birth" classifier to the dataset where over 90% of the dataset contains phone numbers.

Moreover, when processing large amounts of data via a single, predefined order of classifiers with different data types over a long time period, some conventional systems can experience high latency and expose such data to privacy or security risks. In particular, by utilizing a single predefined order of classifiers to classify large amounts of data, the conventional systems may not be able to locate and classify specific types of time-sensitive data. As an example, utilizing a single, predefined order of classifiers to classify large amounts of data (e.g., petabytes of data), as in conventional systems, can result in significant processing wait times for classifying highly sensitive/confidential data. In particular, scanning, extracting, and classifying data elements from such large amounts of data can result in wait times of several days or weeks. Leaving highly sensitive data in such a state can introduce a significant amount of risk that highly sensitive data is exposed to malicious actors by, for example, failing to classify the data according to its sensitivity and to timely implement relevant controls (e.g., in various downstream operations) at the processing devices or in repositories where the data resides.

In some aspects, the disclosed classification priority management system provides a number of advantages over conventional systems. For example, classification priority management system provides improved efficiency and flexibility to computing systems that classify data in digital datasets. In contrast to conventional systems that utilize a single, predefined order of classifiers to categorize data, the classification priority management system dynamically determines an order of priority for classifiers based on data types encountered in a dataset. In particular, the classification priority management system can determine a priority order of classifiers for applying more relevant classifiers to data in the dataset. Moreover, the classification priority management system can dynamically update the order and/or type of classifiers for different digital datasets or different portions of datasets as the classification priority management system discovers different or new subsets of data.

Additionally, the classification priority management system can improve data security by quickly classifying the most relevant data. In contrast to conventional systems that can leave sensitive data exposed to data breaches or other security/privacy risks, the classification priority management system dynamically determines classifier priorities utilizing an initial set of data for use in applying the most relevant classifiers first when processing additional sets of data. Accordingly, by identifying sensitive information in digital datasets and reordering the priority of classifiers to quickly classify the most relevant data first in datasets with large portions of sensitive or other important information, the classification priority management system can reduce the security risks to the highly sensitive information (e.g., by providing the sensitive information to downstream operations for implementing specific controls). Furthermore, the classification priority management system can adapt to new datasets by reconfiguring the classifier orders for each new dataset according to the content and context of the datasets (e.g., relative to the data types discovered within the new datasets and/or various requirements applicable to the new datasets).

Turning now to the figures, FIG. 1 includes an aspect of a system environment 100 in which a classification priority management system 102 is implemented. In particular, the system environment 100 includes a server device 104, a client device 106, and a third-party computing system 108, and data processing system 116 in communication via a network 114. Moreover, the third-party computing system 108 includes or is communicatively coupled to a digital data source 112. FIG. 1 also shows that the client device 106 includes client application 110.

As shown in FIG. 1, in one or more aspects, the server device 104 can include or host the classification priority management system 102. Specifically, the classification priority management system 102 includes, or is part of, one or more systems that extract, classify and/or process digital elements (e.g., digital content items or portions of digital content items) from the digital data source 112 at the third-party computing system 108. For example, the classification priority management system 102 provides tools to the client device 106 for extracting and classifying data associated with an entity. In one or more aspects, the classification priority management system 102 provides tools to the client device 106 via the client application 110 for viewing and managing information associated with the entity and/or data that the entity handles (e.g., extracts, classifies, processes, transmits, or stores).

As used herein, the term "data element" refers to a unit of data that represents a piece of information. In particular, a data element can correspond to a type of data and represent a value, feature, and/or characteristic of data. For example, a data element can be a number, string of text, date, Boolean value (e.g., true or false determination), decimal and/or combination of the aforementioned features. For instance, social security numbers (SSNs), first names, last names, IP addresses, ages, email addresses, telephone numbers, dates of birth are a few examples of data elements. In some cases, external data assets and/or fields can be mapped to a data element. Additionally, a data element can include a combination of other data elements, such as a digital content item including text, numbers, etc. In one or more aspects, a data element has a universal definition across a plurality of data sources and applies to several entities and/or third-party computing systems. Alternatively, a data element is associated with a single entity or data source. For example, an entity can define the meaning, features, and/or characteristics of the data element and utilize the classification priority management system 102 to collect and/or generate certain information that solely pertains to that entity.

As used herein, the term "digital dataset" refers to a computer representation of a plurality of data elements. For example, a digital dataset includes, but is not limited to, digital content items including text or images stored in a digital format such as a computer file. According to one or more aspects, a digital dataset includes a text document with one or more data tables with rows and columns of data associated with one or more topics. In some aspects, a digital dataset includes a form (e.g., a medical form) with fields corresponding to one or more topics. In further aspects, a digital dataset includes a digital record of a transaction (e.g., an electronic payment transaction) including data or metadata identifying details of the transaction. A digital dataset can also include a portion of a computing application, such as an executable, a script, a dynamic link library, or other digital file. Furthermore, a digital dataset can include one or more data elements. Relatedly, the digital dataset can comprise heterogenous data elements (e.g., a mixture of datatypes with various formats).

According to one or more aspects, the classification priority management system 102 extracts and/or manages data elements and digital datasets by communicating with the digital data source 112 (e.g., via the third-party computing system 108). Specifically, the classification priority management system 102 can communicate with the digital data source 112 to determine or otherwise obtain information associated with data elements and/or digital datasets.

In some aspects, the client device 106 controls or uses the third-party computing system 108 and/or the digital data source 112 for the entity. The classification priority management system 102 may be configured to communicate with the digital data source 112 on behalf of the entity via an integration that is installed on the third-party computing system 108 that is configured with the entity's credentials (e.g., via an integrated data extraction software application). The classification priority management system 102 can obtain metadata, data elements, and/or other information about the digital datasets. As further described in relation to FIG. 10, the classification priority management system 102 can include one or more portions in a cloud-based environment and one or more portions in a client-side environment (e.g., at the client device 106 or the third-party computing system 108) to access the digital data source 112.

In one or more aspects, the term "data extraction software application" refers to a computing application that operates on a computing device to extract data (e.g., data elements, digital datasets, or digital objects) from the computing device or another computing device. For example, the classification priority management system 102 includes a data extraction software application to access the digital data source 112 utilizing credentials (e.g., login information, tokens) to extract (e.g., obtain or retrieve) data including files, directories, or data within files. Additionally, in some aspects, the classification priority management system 102 utilizes the data extraction software application to install one or more scripts, functions, or components of the data extraction software application at one or more other computing devices (e.g., the digital data source 112 and/or the third-party computing system 108). Thus, the classification priority management system 102 can integrate with the digital data source 112 and/or the third-party computing system 108 via the data extraction software application.

The classification priority management system 102 can further communicate with the data processing system 116 to manage processing of digital datasets and data elements from the digital data source 112. For instance, the classification priority management system 102 can label the data elements and/or digital datasets (e.g., by classifying the data elements and/or digital datasets utilizing a classification model) and then route the classified data elements and/or digital datasets to the data processing system 116. Accordingly, the classification priority management system 102 can manage routing of data from the third-party computing system 108 to the data processing system 116 according to various characteristics (e.g., priority levels) associated with the labeled data. The data processing system 116 can utilize the data to perform one or more downstream operations.

Furthermore, the classification priority management system 102 can communicate with the client device 106 to obtain information associated with the data elements and/or digital datasets or to provide information about the data elements, classifier labels, and/or digital datasets for display within the client application 110. For instance, the classification priority management system 102 can obtain, via user input received from the client device 106, metadata, classifier labels, and/or other information about the digital element, digital content items and provide for display information regarding the metadata, classifier labels, data elements in a classifier record.

In one or more aspects, the third-party computing system 108 includes server devices, individual client devices, or other computing devices associated with an entity. For instance, a third-party computing system includes one or more digital data source(s) and/or one or more computing devices for performing one or more data processes involving handling data associated with one or more operations of the entity subject to various data requirements (e.g., security requirements such as encryption requirements or privacy, legal, or ethical requirements). To illustrate, the third-party computing system 108 includes one or more server devices that generate, process, store, and/or transmit labeled payment card processing data subject to PCI DSS in one or more jurisdictions.

In one or more aspects, the server device 104 includes a variety of computing devices, including those described below with reference to FIG. 12. For example, the server device 104 includes one or more servers for storing and processing data associated with one or more data processes. In some aspects, the server device 104 can also include a plurality of computing devices in communication with each other, such as in a distributed storage environment. In some aspects, the server device 104 includes a content server. The server device 104 also optionally includes an application server, a communication server, a web-hosting server, a social networking server, a digital content campaign server, or a digital communication management server.

In one or more aspects, the client device 106 includes, but is not limited to, a desktop, a mobile device (e.g., smartphone or tablet), or a laptop including those explained below with reference to FIG. 12. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data elements, digital datasets, classifiers, classifier labels, labeled data elements, and/or data processes involving the digital datasets in connection with one or more digital data requirements or downstream operations. In some aspects, the client device 106 also perform functions for generating, capturing, or accessing data to provide to the classification priority management system 102 in connection with classifying data elements and/or processing the digital datasets. For example, the client device 106 communicates with the server device 104 via the network 114 to provide information (e.g., user interactions) associated with digital datasets, data elements, and/or classifiers. Although FIG. 1 illustrates the system environment 100 with a single client device, in some aspects, the system environment 100 includes a plurality of client devices. In some aspects, the client device 106 or the server device 104 also host the digital data source 112.

Additionally, as shown in FIG. 1, the system environment 100 includes the network 114. The network 114 enables communication between components of the system environment 100. In one or more aspects, the network 114 may include the Internet or World Wide Web. Additionally, the network 114 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device 104, the client device 106, the digital data source 112, the third-party computing system 108, and the data processing system 116 communicate via the network 114 using one or more communication platforms and technologies suitable for transporting data and/or communication signals, including any known communication technologies, devices, media, and protocols supportive of data communications, examples of which are described with reference to FIG. 12.

Although FIG. 1 illustrates the server device 104, the client device 106, the third-party computing system 108, and the data processing system 116 communicating via the network 114, in alternative aspects, the various components of the system environment 100 communicate and/or interact via other methods (e.g., the server device 104, the client device 106, the third-party computing system 108, and/or the data processing system 116 can communicate directly). Furthermore, although FIG. 1 illustrates the classification priority management system 102 and the data processing system 116 being implemented separately within the system environment 100, the classification priority management system 102 and the data processing system 116 can alternatively be implemented, in whole or in part, by a particular component and/or device within the system environment 100 (e.g., the server device 104). Additionally, in some aspects, the third-party computing system 108 includes the client device 106.

In some aspects, the classification priority management system 102 can be executed on a server system that provides a multi-tenant environment. The multi-tenant environment can include a tenant (e.g., one or more user accounts sharing common privileges with respect to an application instance) accessible by a particular set of client devices, as well as other tenants inaccessible to that set of client devices (e.g., access controlled to permit only access from other sets of client devices). For instance, in (or otherwise in connection with) the tenant accessible by a particular client system of one or more client devices, certain digital datasets used by the classification priority management system 102 apply to that client system (e.g., the digital datasets correspond to functions or infrastructure of the entity using the client system), with other tenants having other digital datasets, and instances of the software components of the classification priority management system 102 described herein may only be available to the client system, with other tenants having access other instances of these software components. In additional or alternative aspects, the classification priority management system 102 can be implemented on one or more computing systems operated by a single entity. For instance, the classification priority management system 102 (or portions of the classification priority management system 102) can be operated on a first server system controlled by the entity (e.g., via an on-premises installation of software components described herein) and can communicate with a second server system that is a client system controlled by the entity.

In some aspects, the server device 104 supports the classification priority management system 102 on the client device 106. For instance, the server device 104 generates/maintains the classification priority management system 102 and/or one or more components of the classification priority management system 102 for the client device 106. The server device 104 provides the generated classification priority management system 102 to the client device 106 (e.g., as a software application/suite). In other words, the client device 106 obtains (e.g., downloads) the classification priority management system 102 from the server device 104. At this point, the client device 106 is able to utilize the classification priority management system 102 to classify data elements, manage digital content items, and/or process digital datasets independently from the server device 104.

In alternative aspects, the classification priority management system 102 includes a web hosting application that allows the client device 106 to interact with content and services hosted on the server device 104. To illustrate, in one or more aspects, the client device 106 access a web page supported by the server device 104. The client device 106 provide input to the server device 104 to perform data classification operations, and, in response, the classification priority management system 102 on the server device 104 performs operations to classify data associated with digital data processing. The server device 104 provides the output or results of the operations to the client device 106.

Figure 2:
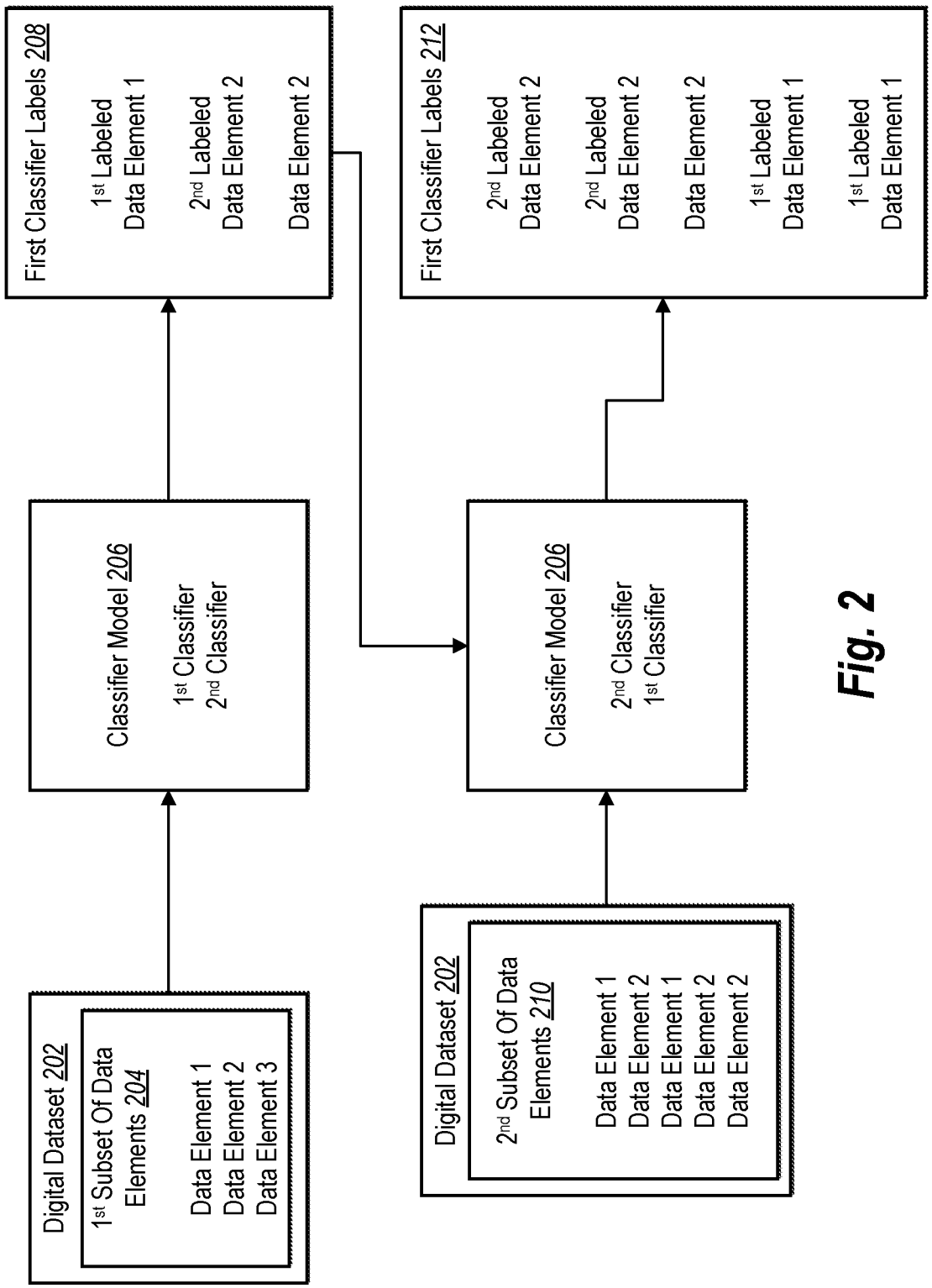
FIG. 2 illustrates an example of an overview of the classification priority management system determining a priority order of classifiers in accordance with one or more aspects.

As mentioned, the classification priority management system 102 can determine a priority order of classifiers of a classifier model based on classifier labels. FIG. 2 illustrates an overview of the classification priority management system 102 generating classifier labels for a first subset of data elements and determining a priority order of classifiers based on the classifier labels. In particular, the classification priority management system 102 determines a classifier label frequency (e.g., match rate) and determines the priority order of the classifiers based on the classifier label frequency. Furthermore, the classification priority management system 102 can generate classifier labels for a second subset of data according to the priority order of the classifiers of the classifier model.

As illustrated in FIG. 2, the classification priority management system 102 accesses a digital dataset 202. In one or more aspects, the classification priority management system 102 extracts a first subset of data elements 204 from the digital dataset 202 stored at a digital data source. For example, the classification priority management system 102 can extract (e.g., sample) the first subset of data elements 204 as a test dataset from the digital dataset 202.

In some aspects, the classification priority management system 102 extracts the first subset of data elements 204 by utilizing a machine-learning model that extracts features and/or metadata related to data elements from the digital dataset. For example, the classification priority management system 102 can extract a data type and data value associated with the data element. To illustrate, in a dataset comprising digital files related to financial information that contain fields for names, addresses, SSNs, checking account balances, etc., the classification priority management system 102 can extract the data elements corresponding to the information in the fields for names, addresses, SSNs, checking account balances, etc. For instance, the classification priority management system 102 can extract all of the addresses in the files related to financial information.

As indicated above, in one or more aspects, the first subset of data elements 204 can be associated with a single entity. For example, the first subset of data elements 204 may comprise personal identifying information collected by the entity or usernames generated by the entity. In certain cases, the first subset of data elements 204 can be shared across multiple entities.

In one or more implementations, the classification priority management system 102 classifies the first subset of data elements 204 by inputting the data elements into a classifier model 206. As shown in FIG. 2, the classifier model includes a group of classifiers. As used herein, the term "classifier model" refers to one or more computer functions that classify digital data into various categories. For example, a classifier model processes data elements and outputs a classification for each data element according to a classification scheme. In some instances, the classifier model includes a machine-learning model or neural network that learns to classify data into a set of categories based on features, characteristics, or other attributes of the data element. In some instances, the classifier model can classify data by utilizing one or more classifiers that match data elements to classifier labels. In some cases, a classifier model can apply a set of classifiers to data elements in a data set in a specific sequence. As discussed in more detail below, the classification priority management system 102 can rearrange the sequence of classifiers, add classifiers, and/or remove classifiers from a classifier model. In additional aspects, the classifier model includes a set of computer functions that utilize predefined mappings to determine a category (e.g., classifier label) for each data element. In some implementations, the classifier model accesses a classification profile that provides mappings between specific data elements and specific classifiers.

Relatedly, as used herein, the term "classifier" refers to a machine-learning model or algorithm that analyzes and/or identifies data elements in a data source and places the data element in a category/class based on the attributes and/or features of the data element. For example, the classifier can analyze metadata in a data source and identify the data elements in the data source based on the metadata. In particular, based on the features of the data elements, the classifier can generate classifier labels for the data elements. For example, the classifier can assign first classifier labels to a first subset of data elements. In some aspects, a classifier may be, but is not limited to, a decision tree, deep neural network, named entity recognition (NER), or gradient boosted tree. As discussed in more detail below, in some aspects a classifier can include sub-classifiers.

As illustrated in FIG. 2, the classification priority management system 102 can utilize a classifier model 206 that applies classifiers according to a predetermined order. Specifically, the classifier model 206 can apply a first classifier followed by a second classifier, then a third classifier, etc., based on a default or initial order of classifiers. For instance, the classification priority management system 102 can apply an email classifier before applying a telephone classifier to the first subset of data elements.

As further shown in FIG. 2, the classification priority management system 102 generates classifier labels for the data elements. More specifically, the classification priority management system 102 generates first classifier labels 208 for the first subset of data elements 204. As used herein, the term "classifier label" refers to a label (e.g., tag, identifier, etc.) reflecting a category or class to which the data element belongs. For example, a classifier label can correspond to a label definition which describes the features associated with the classifier label and dictates how the classifier detects the data element matching with the classifier label. In some aspects, the classifier label corresponds to a group of classifiers (e.g., personally identifiable information label corresponding to social security numbers, driver license numbers, state identification card numbers). In some cases, a classifier label is associated with a single classifier (e.g., a date of birth label corresponding to dates of birth).

As further shown in FIG. 2, the classification priority management system 102 determines a priority order of the classifiers. In particular, the classification priority management system 102 generates a priority order of the classifiers by modifying the predetermined order of classifiers. For instance, the classification priority management system 102 can determine an order in which the classifier model 206 should apply classifiers to additional data of the digital dataset 202 after the first subset of data elements 204. For example, based on the frequency (e.g., match rate) of the first classifier labels for the first subset of data elements, the classification priority management system 102 can update the order of applying the classifiers. To illustrate, if the second classifier generates more classifier labels for the first subset of data elements than the first classifier, the classification priority management system 102 adjusts the priority of the second classifier to be higher than the first classifier.

As further shown in FIG. 2, the classification priority management system 102 can extract a second subset of data elements 210 from the digital dataset 202. The classification priority management system 102 can input the extracted second subset of data elements 210 into the classifier model 206. In some aspects, the classification priority management system 102 extracts the first subset of data elements 204 and the second subset of data elements 210 together (e.g., in a single extraction process). In alternative aspects, the classification priority management system 102 extracts the first subset of data elements 204, generates the first classifier labels 208, and then extracts the second subset of data elements 210. As further illustrated in FIG. 2, the classification priority management system 102 can generate second classifier labels 212 for the second subset of data elements 210 by applying the classifiers according to the updated priority order to the second subset of data elements.

Accordingly, as illustrated in FIG. 2, the classification priority management system 102 can determine a priority order for applying classifiers to data elements. By dynamically classifying data based on the predominance of certain data elements, the classification priority management system 102 can efficiently determine a classification scheme for the data set. As an example, because some datasets have varying degrees of data elements, applying a classifier that matches with the majority of the data elements in the dataset enables the classification priority management system 102 to quickly and efficiently categorize large datasets without needlessly scanning through data trying to apply classifiers that are not relevant to the dataset. Moreover, quickly categorizing data elements within the dataset helps the classification priority management system 102 to quickly process data elements and/or digital datasets in view of one or more system requirement frameworks and/or regulations.

As just mentioned, by quickly and dynamically updating the priority order of classifiers, the classification priority management system 102 can enable other systems associated with the classification priority management system 102 to provide tools for managing one or more computing devices and/or datasets in connection with digital data requirements associated with various legal, ethical, or other standards. To illustrate, digital data requirements can include internal or external requirements for handling specific types of data. For instance, digital data requirements can include requirements to implement specific controls for handling one or more data types, such as data encryption controls, user access controls, and the like. Furthermore, because certain types of data can have higher time sensitivity than other data types, by quickly and efficiently classifying data elements in large digital datasets, the classification priority management system 102 helps entities meet time sensitive digital data requirements.

Figure 3:
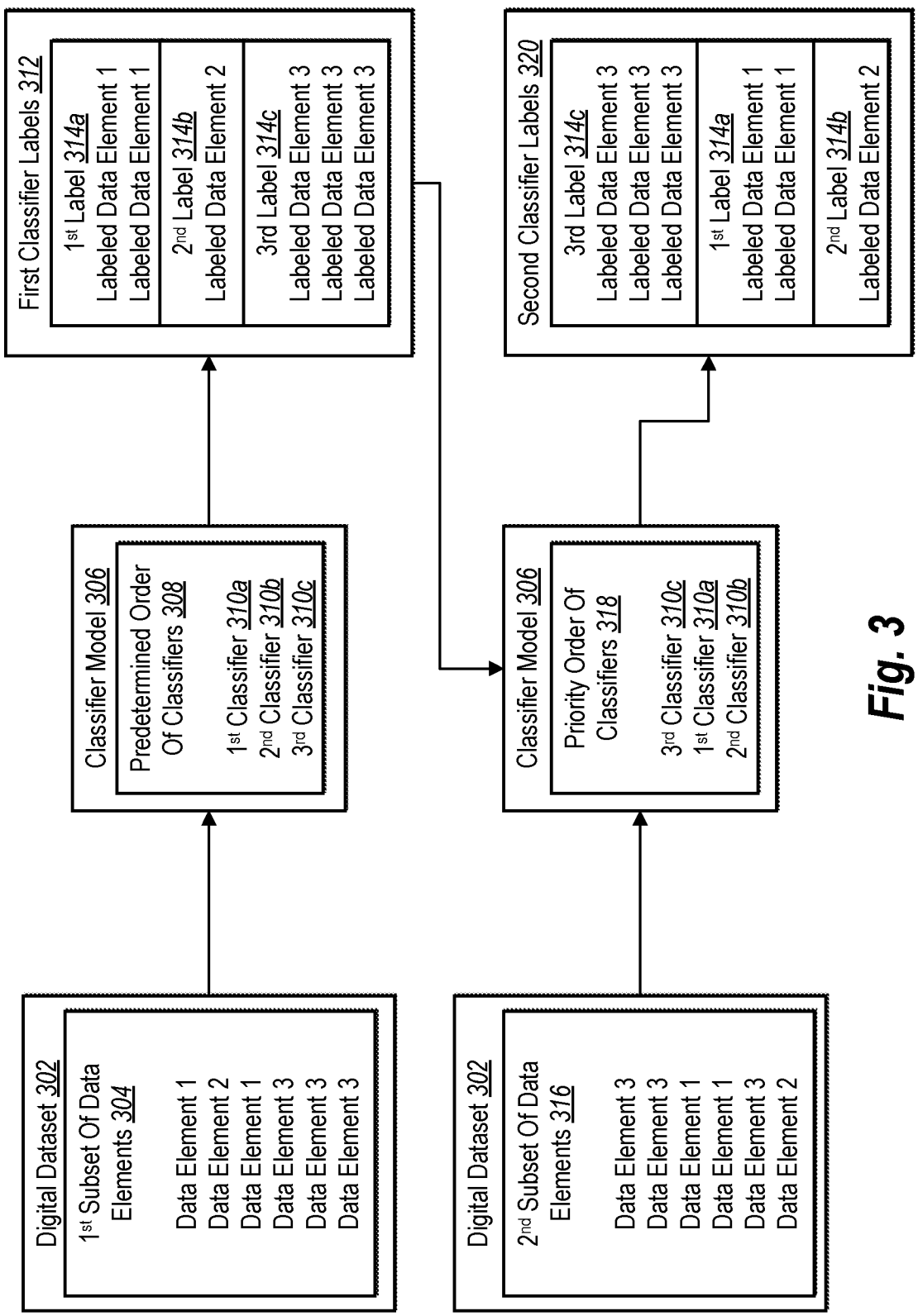
FIG. 3 illustrates an example of the classification priority management system generating first classifier labels, a priority order of the classifiers, and second classifier labels in accordance with one or more aspects.

FIG. 3 illustrates an example of the classification priority management system generating first classifier labels, a priority order of the classifiers, and second classifier labels in accordance with one or more aspects. As indicated above, the classification priority management system 102 can extract data elements from a digital dataset. In particular, the classification priority management system 102 can extract (e.g., collect, identify, or recover) data elements from various data sources (e.g., various cloud-based services, local servers, or other storage computing devices), including structured or unstructured data sources. For example, the classification priority management system 102 can identify metadata (e.g., applications, database types, data types, table names, column names, etc.) from third-party data sources and extract data elements from the digital data source.

In some aspects, the classification priority management system 102 performs a full data extraction by retrieving all data from the digital data source. In additional or alternative aspects, the classification priority management system 102 performs incremental data extraction by only recovering new and/or modified data since the last extraction event. For example, the classification priority management system 102 can implement a scanning frequency which defines how often the classification priority management system 102 extracts data from the digital data source. In such aspects, the classification priority management system 102 extracts a defined amount of data from the digital data source. In additional or alternative aspects, the classification priority management system 102 utilizes a hybrid approach. In the hybrid approach, the classification priority management system 102 periodically performs full data extraction, and also implements incremental data extraction for more frequent updates. Moreover, in certain aspects, the classification priority management system 102 stores information (e.g., records) associated with the digital data source. For example, the classification priority management system 102 can store a unique name, credentials, scanning frequency, asset mapping, and activation for the digital data source.

As discussed above, data elements can represent various types of data and provide information regarding that data. For example, the classification priority management system 102 can extract a social security number data element from the data source by identifying a column titled "SSN" containing numbers formatted as NNN-NN-NNN.

As just mentioned, the classification priority management system 102 can extract data from a digital data source by scanning the digital data source with a machine-learning model. In some implementations the classification priority management system 102 utilizes extraction methods while scanning structured and unstructured data. For instance, the classification priority management system 102 can utilize extraction methods including, but not limited to, structured query language (SQL), application programming interfaces (APIs), web scraping, ETL, text mining and natural language processing (NLP) and/or image and video processing. In some aspects, the classification priority management system 102 needs credentials to access the digital dataset 302 from the digital data source before extraction.

Turning back to FIG. 3, in response to extracting a first subset of data elements 304 comprising one ro more instances of data element 1 (e.g., a first data type), one or more instances of data element 2 (e.g., a second data type), and one or more instances of data element 3 (e.g., a third data type), the classification priority management system 102 can input the first subset of data elements 304 into the classifier model 306. As shown in FIG. 3, the classifier model 306 includes a set of classifiers. In particular, the classifier model 306 includes a predetermined order of classifiers 308.

As used herein the term "predetermined order of classifiers" refers to an initial sequence of classifiers. For example, the classification priority management system 102 can apply one or more classifiers on an initial set of data elements from the digital dataset 302 according to a specific, predetermined sequence. In one or more implementations, the classification priority management system 102 determines the predetermined order of classifiers based on alphabetical order of the classifiers or expected success rate of the classifiers. Alternatively, in some instances, the classification priority management system 102 can receive user input dictating the predetermined order of classifiers 308.

As further shown in FIG. 3, the classification priority management system 102 can generate first classifier labels 312 for the first subset of data elements 304. In particular, the classifier model 306 generates the first classifier labels according to the predetermined order of classifiers. For example, the classification priority management system 102 can apply the first classifier 310a to instances of data element 1, instances of data element 2, and instances of data element 3 from the first subset of data elements 304. Subsequently, based on data element 1 corresponding to the first classifier 310a, the classification priority management system 102 can generate a first label 314a for instances of data element 1. In one or more aspects, the classification priority management system 102 applies the first classifier 310a to all data elements in the first subset of data elements 204 to determine whether the individual data elements are of a data type corresponding to the first classifier 310a.

As further shown in the FIG. 3, the classification priority management system 102 can apply the second classifier 310b to the first subset of data elements 304. The classification priority management system 102 can generate a second label 314b for data element 2 based on data element 2 corresponding with the second classifier 310b. FIG. 3 illustrates that the classification priority management system 102 can also generate a third label 314c by applying the third classifier to the first subset of data elements. Like the previous examples, the classification priority management system 102 can generate the third label 314c for the third data element based on the third data element corresponding to the third classifier 310c.

As further shown in FIG. 3, the classification priority management system 102 can generate a priority order of classifiers 318 of the classifier model 306. As used herein, the term "priority order of classifiers" refers to a dynamic sequence of classifiers that changes based on priority criteria such as the classifier label frequencies (e.g., match rates or success rates) determined from applying the classifiers to a set of data elements (e.g., from previous datasets and/or training datasets). For example, a priority order of classifiers can include a high priority classifier that applies labels to the majority of data elements in the digital dataset, a low priority classifier that applies labels to a minority of data elements in the digital dataset, and one/or more other classifiers that apply classifier labels to a mid-range of data elements in the digital dataset. Additionally, in some examples, the classification priority management system 102 stores a priority order of classifiers in a tree data structure to maintain an order of classifiers/sub-classifiers based on confidence scores. In some instances, the priority order of classifiers differs from the predetermined order of classifiers in both order and/or number of classifiers. For example, in addition to reordering the classifiers in the classifier model, the classification priority management system 102 may add classifiers to the priority order of classifiers and/or remove classifiers from the priority order of classifiers.

For instance, as shown in FIG. 3, the priority order of classifiers 318 differs from the predetermined order of classifiers 308. As discussed above, the classification priority management system 102 determines the priority order of classifiers 318 based on the first classifier labels 312. In particular, the classification priority management system 102 determines the priority order of classifiers 318 based on a classifier label frequency (e.g., match rate). For example, as illustrated in FIG. 3, the third label 314c corresponding to the third classifier 310c applies to the most data elements in the digital dataset 302. If the third label 314c has the most frequent labeled data elements, the classification priority management system 102 gives the third classifier 310c the highest priority. Similarly, as shown in FIG. 3, the classification priority management system 102 can order the first classifier 310a behind the third classifier 310c because the first classifier has the second highest classifier label frequency. As further shown in FIG. 3, the second classifier 310b has the lowest priority because it has the lowest classifier label frequency. Thus, the classification priority management system 102 can prioritize classifying data based on the most relevant data elements in the digital dataset 302.

In some aspects, the classification priority management system 102 updates the priority order of classifiers based on the match rate of all classifiers. In one or more aspects, the classification priority management system 102 determines the priority order of classifiers by only modifying the priority (e.g., position) of the most successful (e.g., highest match rate) classifier while maintaining the predetermined priority order for the remaining classifiers. For instance, the classification priority management system 102 can update the priority order of the top two most successful classifiers (or other specified number of classifiers) while keeping the predetermined priority order of the remaining classifiers. By updating the priority order of the most successful classifiers, the classification priority management system 102 can quickly prioritize the most relevant classifiers without devoting resources to changing the sequence of other less important classifiers. Furthermore, in some implementations the classification priority management system 102 can remove a classifier from the priority order of classifiers if the classifier does not apply to any of the data elements in the digital dataset.

In one or more aspects, the classification priority management system 102 updates a priority order of classifiers based on additional criteria. For example, the classification priority management system 102 can determine a fixed order for a classifier set (e.g., a set of one or more classifiers) and can dynamically order other classifiers, such as based on a user input indicating the fixed order for the classifier set. In additional examples, the classification priority management system 102 can maintain an order of specific classifiers based on one or more thresholds associated with the match rates. To illustrate, in response to determining that the match rate for a specific classifier to the first subset of data elements 304 does not exceed a threshold value, the classification priority management system 102 can determine not to reorder the classifier above one or more other classifiers. Alternatively, the classification priority management system 102 can determine the priority order of classifiers 318 based on differences in match rates for two or more classifiers (e.g., relative to one or more threshold values).

As further illustrated in FIG. 3, the classification priority management system 102 can extract a second subset of data elements 316 from the digital dataset 302. As described above, the classification priority management system 102 can utilize a number of methods for identifying and extracting data elements from the digital data source. The classification priority management system 102 can input the second subset of data elements 316 into the classifier model 306. As discussed above, the classification priority management system 102 applies the classifiers 310a-310c according to the updated priority order. In particular, the classification priority management system 102 can apply the third classifier 310c first to the second subset of data elements 316. Accordingly, the classification priority management system 102 can subsequently apply the first classifier 310a. As further illustrated in FIG. 3, the classification priority management system 102 applies the second classifier 310b last to the second subset of data elements 316 because the second classifier 310b has the lowest priority.

In addition, FIG. 3 shows the classification priority management system 102 generating classifier labels for the second subset of data elements 316. In particular, the classification priority management system 102 generates second classifier labels 320 for the second subset of data elements 316. In some aspects, the second classifier labels 320 are similar to the first classifier labels 312 (e.g., the labels applied to the specific data elements may be the same). However, as discussed above, while the labels may be the same, the order in which the classification priority management system 102 generates the classifier labels can change based on the priority order of classifiers 318 being different than the predetermined order of classifiers 308.

Figure 4:
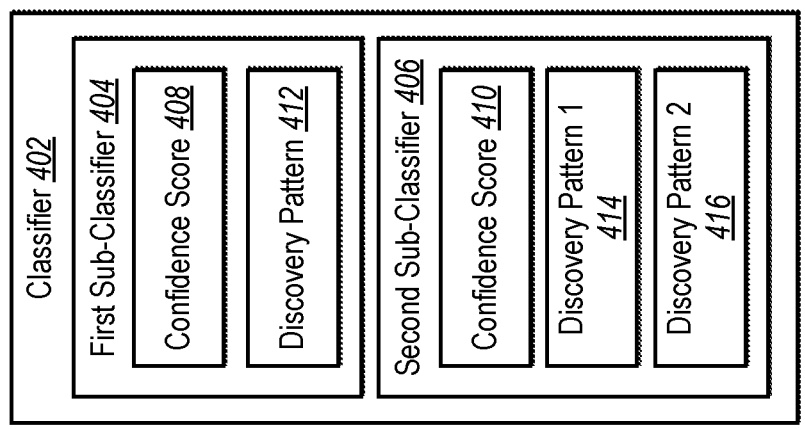
FIG. 4 illustrates an example of sub-classifiers associated with a classifier of the classifier model in accordance with one or more aspects.

As indicated above, in one or more aspects, a classifier can include sub-classifiers. FIG. 4 illustrates an example of sub-classifiers associated with a classifier of the classifier model in accordance with one or more aspects. As shown in FIG. 4, the classifier 402 includes a first sub-classifier 404 and a second sub-classifier 406. As used herein, the term "sub-classifier" refers to one or more classifiers that target and label one or more data elements representing sub-classes that fall under a classifier. In some cases in which the classifier can apply to multiple data elements, sub-classifiers can apply more specific labels to the data elements encompassed by the broader (e.g., higher-level) classifier. In particular, the sub-classifier can use discovery patterns to identify unique characteristics of data and/or data elements. In some aspects, the classification priority management system 102 utilizes discovery patterns such as, but not limited to, data formatting, data type, date ranges, digital checks (e.g., Luhn algorithm), length checks, lookups (e.g., reference lists), and regex (e.g., regular expression) to determine if the features of the data element correspond to the classifier and/or classifier label.

To illustrate, in some cases, the classification priority management system 102 can apply a credit card classifier that detects credit card number data elements and generates a credit card classifier label for the credit card data elements. The classification priority management system 102 can further apply sub-classifiers that identify whether the credit card element is a credit card number associated with a first issuer, a credit card number associated with a second issuer, or a credit card number associated with a third issuer and generate labels indicating the type of credit card. In some aspects, the sub-classifiers can apply to a specific format associated with the classifier label. For example, a social security number ("SSN") classifier label could include sub-classifiers that detect different formats associated with an SSN. For example, a first sub-classifier could identify and generate an SSN classifier label for SSN data elements with the following format: NNN-NN-NNN; a second sub-classifier could identify and generate an SSN classifier label for SSN data elements with the following format NNN NN NNN.

As shown in FIG. 4, the classifier 402 includes the first sub-classifier 404 and the second sub-classifier 406. In this example, the first sub-classifier 404 corresponds to a confidence score 408 and a discovery pattern 412, and the second sub-classifier 406 corresponds to a confidence score 410 and a first discovery pattern 414 and a second discovery pattern 416. As described in more detail below, in regard to FIG. 5, a confidence score represents a relationship between the data element and the classifier from the classifier model. In some aspects, the confidence score can represent the relationship between a sub-classifier and the data element. For instance, a higher confidence score indicates a stronger relationship between the sub-classifier and the data element.

As indicated in FIG. 4, a sub-classifier can include one or more discovery patterns. As used herein, the term "discovery pattern" refers to a method for evaluating data samples for certain features, characteristics, and/or attributes of a data element and/or digital dataset. For example, a data type discovery pattern can search for regularly used data formats (e.g., Text, Number, DateTime). In some aspects, discovery patterns include, but are not limited to, date, digital checks (e.g., a form for validating numbers and reducing false positives), length check (identifying a range of values or a specific character count), lookup (e.g., finding a specific phrase or term that matches the classifier), or regex (a regular expression value that aligns with a desired search pattern). To illustrate, a digital check discovery pattern could verify that a detected sequence of numbers is a Denmark Personal Identification Number by applying a digital check where the first DIGIT_AT is multiplied by 1 (e.g., 4×1), the next DIGIT_AT is multiplied by 3 (e.g., 3×2), and so on.

Returning to FIG. 4, in some aspects, a sub-classifier can correspond to one or more discovery patterns. For instance, a personal identity information sub-classifier can include the first discovery pattern 414 that identifies data elements resembling driver's licenses and the second discovery pattern 416 that looks for data elements resembling an SSN (e.g., having digits with an SSN format). As discussed above, classification priority management system 102 can assign any type and/or number of discovery patterns to a sub-classifier.

Turning now to FIG. 5, the classification priority management system 102 can generate a confidence score between a data element and the classifier label. As used herein, the term "confidence score" refers to a measurement or quantification representing a relationship between a data element and a classifier within a classifier model. In particular, the confidence score can indicate a distance between a data element and the first classifier (e.g., according to a particular value scale based on features of the data element and the first classifier). For example, the confidence score can indicate how well the classifier label applies to the data element based on the distance between the data element and the first classifier, where a higher confidence score indicates a lower distance (and vice versa). In particular, the confidence score can indicate if the features, attributes, and/or characteristics of the data element align with the definitions associated with the classifier. For example, an SSN classifier can apply an SSN classifier label to data elements found in columns titled "social num," "social number", "social security number," "sss number." In one or more aspects, the classification priority management system 102 can utilize a machine-learning model to determine the distance between the classifier and the data element.

In some aspects, the classification priority management system 102 generates the confidence score for the digital element by inputting the digital element into a classification model and applying a classifier that extracts features from the data element (e.g., text data, numerical data, image data etc.) and generates the confidence score based on the features of the data element aligning with the definitions and/or discovery patterns associated with the classifier. For example, as shown in FIG. 5, the classification priority management system 102 inputs data element 1 502 and data element 2 504 into a classifier model 506 comprising a classifier 508. The classification priority management system 102 generates a labeled data element 1 512 with a confidence score reflecting the relationship between data element 1 502 and the classifier 508. The classification priority management system 102 can generate a second confidence score 518 representing the relationship between the data element 2 504 and the classifier 508. The first confidence score 516 for the labeled data element 1 512 is higher than the second confidence score 518 of the labeled data element two 514. The higher first confidence score 516 indicates a closer relationship (e.g., smaller distance) between the data element 1 502 and the classifier 508 than for data element 2 504 and the classifier 508.

To illustrate, in an aspect where an email classifier matches an email data element (e.g., 123@abc.com) from a column titled e-mail with an email classifier label, generates a high confidence score (e.g., 1.00 or 100%) because the distance between the features of the email data element and the classifier label "E-Mail" is zero. In some aspects, ambiguities between data elements and classifiers lowers the confidence score. For example, a date classifier could match a date data element (e.g., Mar. 10, 1987) with a date of birth classifier label or date of employment classifier label. The confidence scores between the date data element (e.g., Mar. 10, 1987) and the date of birth classifier and date of employment classifier are lower because the classification priority management system 102 may not be able to determine if Mar. 10, 1987 represents a date of birth or date of employment. In such instances, the classification priority management system 102 can utilize context surrounding the date data element (e.g., Mar. 10, 1987) to improve the confidence score. For example, if Mar. 10, 1987 exists in column titled DOB, the classification priority management system 102 can more confidently determine that Mar. 10, 1987 refers to a date of birth and generate a date of birth classifier label with a higher confidence score.

As indicated above, the classification priority management system 102 can generate the confidence score between a classifier and a data element by determining that the features of the data element correspond with the classifier label. In some aspects, the classification priority management system 102 does not apply the classifier label to the data element if the confidence score does not meet or exceed a threshold. In an illustrative example, if the classification score between a data element and a classifier falls below a threshold (e.g., 0.90), the classification priority management system 102 will not apply a classifier label to the data element.

In some aspects, the classification priority management system 102 determines the classification threshold based on the dataset. For example, a dataset with highly sensitive data elements (e.g., SSNs, DL numbers, credit card numbers, usernames) could have a higher confidence threshold than a dataset with publicly available information (e.g., first name, last name, etc.). In some cases, the classification priority management system 102 can receive user input defining the confidence score threshold.

Additionally, in some cases, the classification priority management system 102 may generate a plurality of confidence scores that correspond to various classifiers for a single data element. In such cases, the classification priority management system 102 can determine or identify the classifier with the highest confidence score corresponding to the data element and generate a classifier label by apply the classifier with the highest confidence score to the data element. For instance, the classification priority management system 102 can apply a first classifier to a data element to generate a first classifier label with a first confidence score and a second classifier to the data element to generate a second classifier label with a second confidence score. The classification priority management system 102 can assign the first classifier label to the data element in response to determining that the first confidence score is higher than the second confidence score, even if both confidence scores exceed a confidence score threshold.

Figure 6:
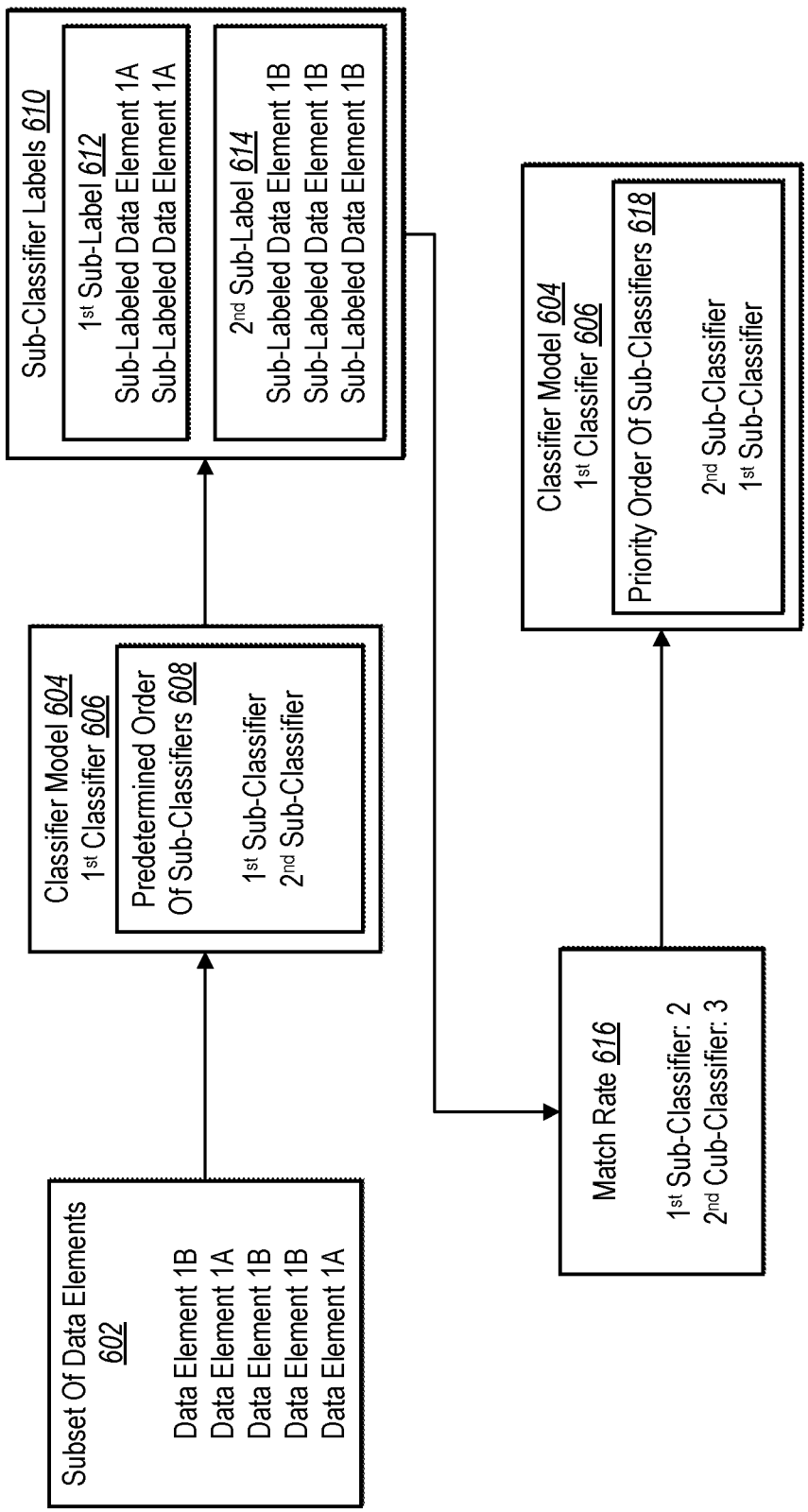
FIG. 6 illustrates an example of the classification priority management system determining the priority order of sub-classifiers based on match rates between the classifiers and data elements in accordance with one or more aspects.

FIG. 6 illustrates an example of the classification priority management system determining an additional priority order of sub-classifiers based on match rates (e.g., classifier label frequencies) between the sub-classifiers and data elements in accordance with one or more aspects. As described above, the classification priority management system 102 can extract a subset of data elements 602 from a digital data source. As further shown in FIG. 6, the classification priority management system 102 can input the subset of data elements 602 into a classifier model 604 including a first classifier 606, which includes a predetermined order of one or more sub-classifiers 608 of the first classifier 606, which may be in addition to a predetermined order of classifiers including the first classifier 606. As described above in reference to FIG. 3, the classification priority management system 102 can apply the sub-classifiers to the subset of data elements according to a predetermined sequence indicated by the predetermined order of sub-classifiers 608.

Moreover, is shown in FIG. 6, the classification priority management system 102 can generate sub-classifier labels 610 for the subset of data elements 602. In particular, the classification priority management system 102 can generate a first sub-label 612 for data element 1A and a second sub-label 614 for data element 1B. As discussed above, the first sub-label 612 and the second sub-label can correspond to the first classifier 606 while representing a specific data element corresponding to the first classifier 606.

As further shown in FIG. 6, the classification priority management system 102 can determine a match rate 616 between the subset of data elements 602 and the sub-classifiers. As used herein, the term "match rate" refers to the frequency in which a classifier successfully generates a classifier label for a data element. For example, the match rate can reflect a percentage, ratio, and/or recurrence of a specific classifier label. In some examples, the match rate indicates a successful generation of a classifier label in response to meeting a confidence score threshold. For example, the first sub-label 612 has a match rate 616 of 2 because the first sub-classifier resulted in two sub-labeled data elements 1A. Similarly, the match rate 616 of the second sub-label 614 is 3 because the second sub-classifier generated three sub-labeled data elements 1B. Alternatively, a match rate may include a proportion or percentage value based on the number of successful matches relative to a total possible number of matches (e.g., 1 in 1000 equals a 0.1% match rate).

As shown in FIG. 6, and as discussed above with respect to FIG. 3, the classification priority management system 102 can determine a priority order of one or more sub-classifiers 618, which may be in addition to a priority order of classifiers. In particular, based on the match rate of the second sub-classifier exceeding the match rate of the first sub-classifier, the classification priority management system 102 can update the priority order of the classifiers to prioritize the second sub-classifier over the first sub-classifier. In some aspects, the classification priority management system can update the priority order of classifiers and sub-classifiers in the classifier model. In particular, based on the match rates of the classifiers and sub-classifiers, the classification priority management system 102 can modify the sequence in which the classification priority management system 102 utilizes a classifier model to apply classifiers and sub-classifiers to datasets. In some aspects, the classification priority management system 102 updates the priority order of classifiers and/or sub-classifiers based on the classifiers and/or sub-classifiers exceeding a match rate value. For example, the classification priority management system 102 only updates the priority order for sub-classifiers and/or classifiers that have over a 40% match rate.

Figure 7:
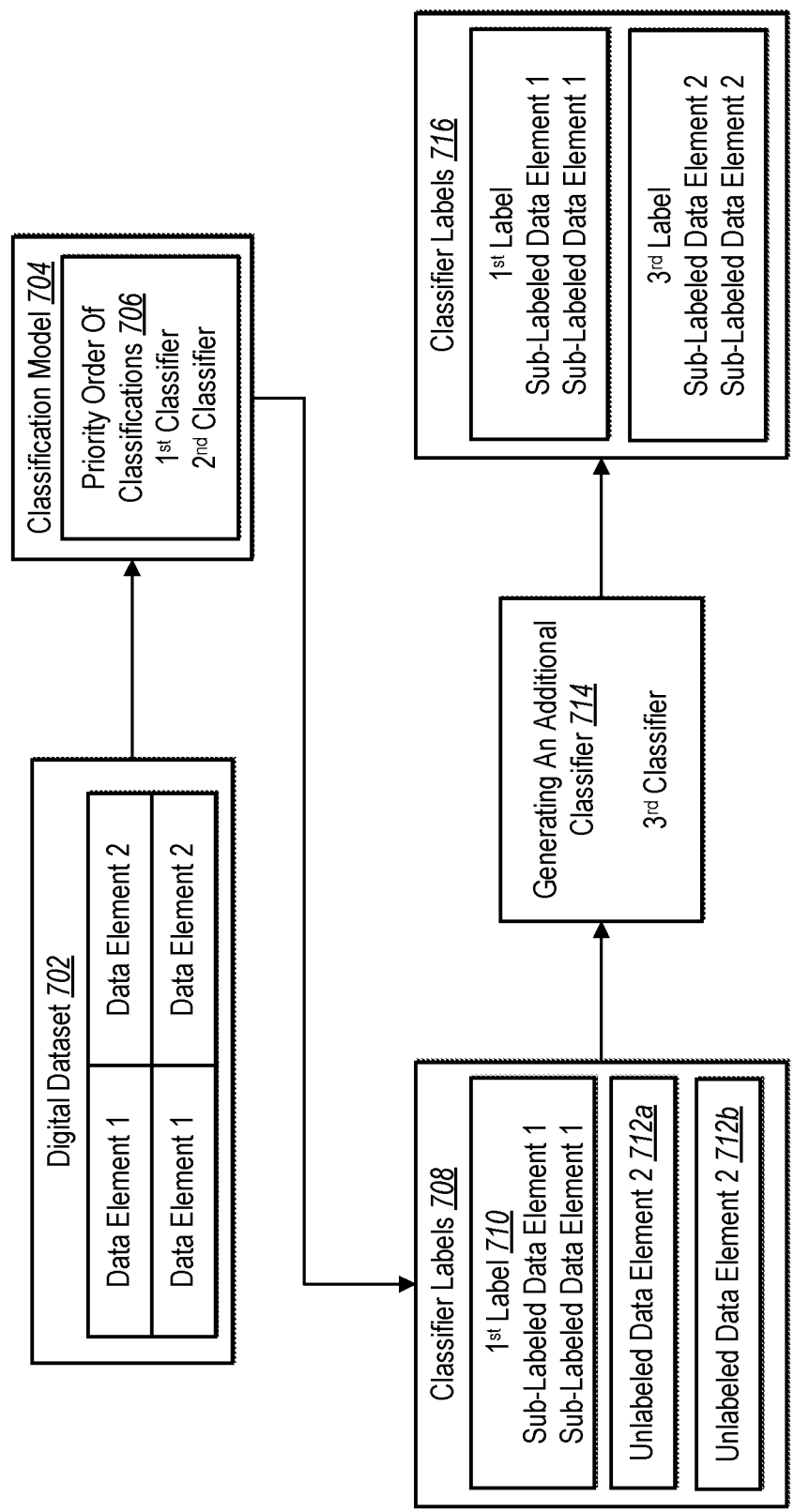
FIG. 7 illustrates an example of the classification priority management system generating an additional classifier for an unlabeled data element in accordance with one or more aspects.

FIG. 7 illustrates an example of the classification priority management system generating an additional classifier for an unlabeled data element in accordance with one or more aspects. As mentioned above, the classification priority management system 102 can generate a classifier label in response to the classification priority management system 102 determining with a high confidence that the classifier applies to the data element. In some cases, the data element does not correspond to any classifier in a classifier set (e.g., one or more classifiers) in the classifier model. In such instances, the classification priority management system 102 can generate, retrieve, and/or add an additional classifier that corresponds to the unlabeled data element. An example of an unlabeled data element is an element that has not yet been classified or has not been successfully classified using a classification model 704.

For example, FIG. 7 illustrates a digital dataset 702 with two columns. The first column contains a plurality of instances of data element 1 and the second column contains a plurality of instances of data element 2. As described above, the classification priority management system 102 can input data element 1 and data element 2 into the classifier model 704. As FIG. 7 illustrates, the classifier model has a priority order of classifiers 706 where the first classifier has a higher priority than the second classifier.

As indicated in FIG. 7, the classification priority management system 102 can utilize the classifier model 704 to generate classifier labels 708. In particular, FIG. 7 shows the classification priority management system 102 generating a first label 710 for data element 1 and failing to generate a classifier label for data element 2. As indicated above, in response to determining that the confidence score for a relationship between the data element and one or more classifiers in the classifier model 704 does not exceed a confidence score threshold, the classification priority management system 102 does not label the data element. The output of the classifier model for data element 2 is a first instance of unlabeled data element 2 712a and a second instance of unlabeled data element 2 712b.

Because the classifier model did not generate a classifier label for data element 2 utilizing the existing classifiers, as indicated in FIG. 7, the classification priority management system 102 can generate an additional classifier 714. In particular, based on identifying features of data element two, the classification priority management system 102 can retrieve a classifier from a classifier library that corresponds to the unlabeled data element 2 712 and add the classifier to the priority order of classifiers in the classifier model 704. In certain aspects, the classification priority management system can utilize a machine-learning model to generate the additional classifier based on the features of the data element. In some implementations, based on the confidence score for the relationship between the instances of unlabeled data element 2 (e.g., the first instance of unlabeled data element 2 712a and the second instance of unlabeled data element 2 712b) and the classifiers from the classifier model, the classification priority management system 102 can apply a second set of ordered classifiers to the instances of unlabeled data element 2. Alternatively, in some cases, the classification priority management system 102 can provide for display the unlabeled data element and receive user input dictating a classifier that corresponds to the unlabeled data element.

As further shown in FIG. 7, the classification priority management system 102 can add the additional classifier to the priority order of classifiers 706 and apply the additional classifier (e.g., the third classifier) to the instances of unlabeled data element 2. The classification priority management system 102 can generate a third label by applying the third classifier to the first instance of unlabeled data element 2 712a and the second instance of unlabeled data element 2 712b. For example, the classifier labels 716 include the first label and third label. In some instances, the classification priority management system 102 can send the sub-labeled data elements to the data processing system 116 of FIG. 1 for further processing.

Figure 8:
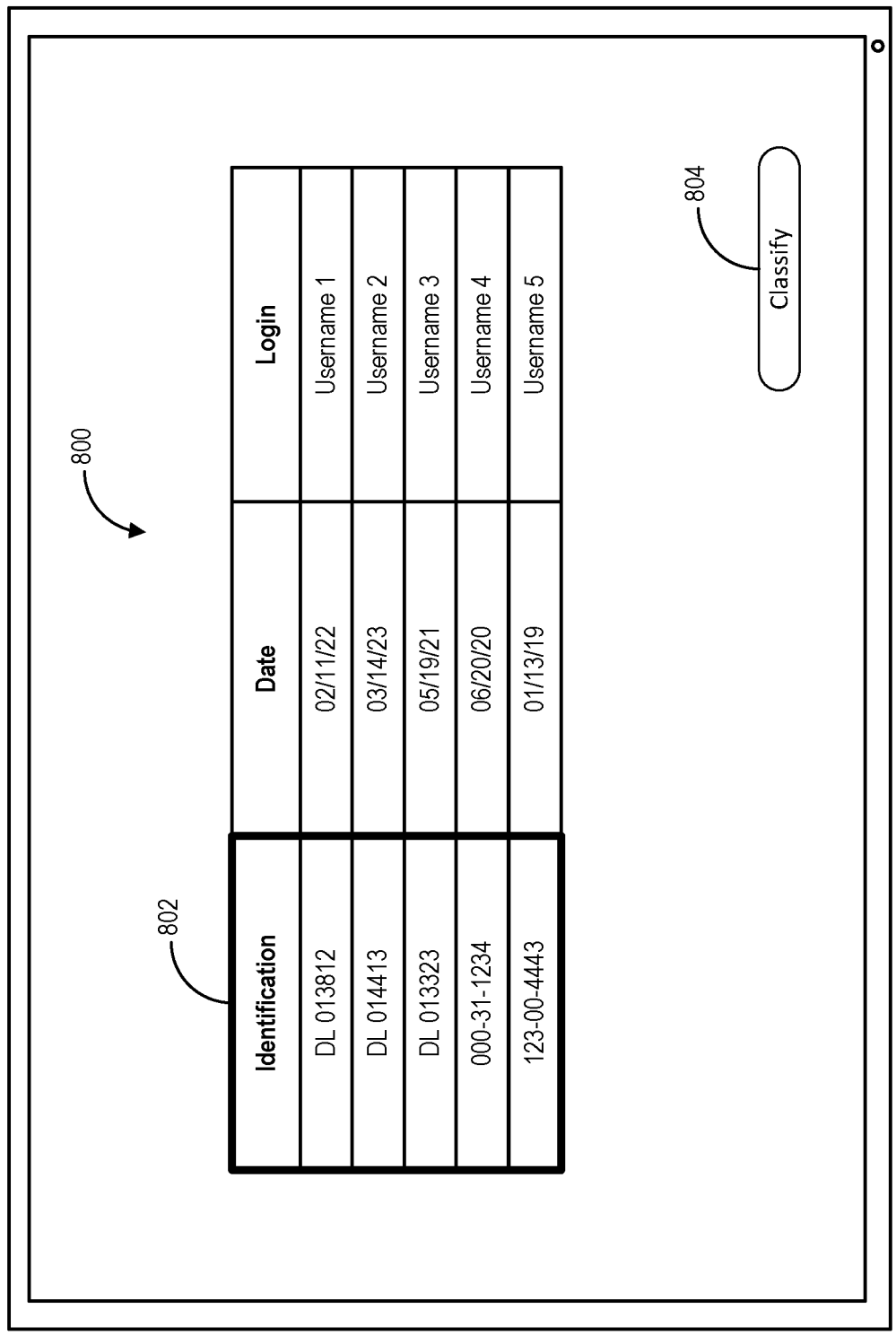
FIG. 8 illustrates an example of a graphical user interface for requesting data classification in accordance with one or more aspects.
Figure 9:
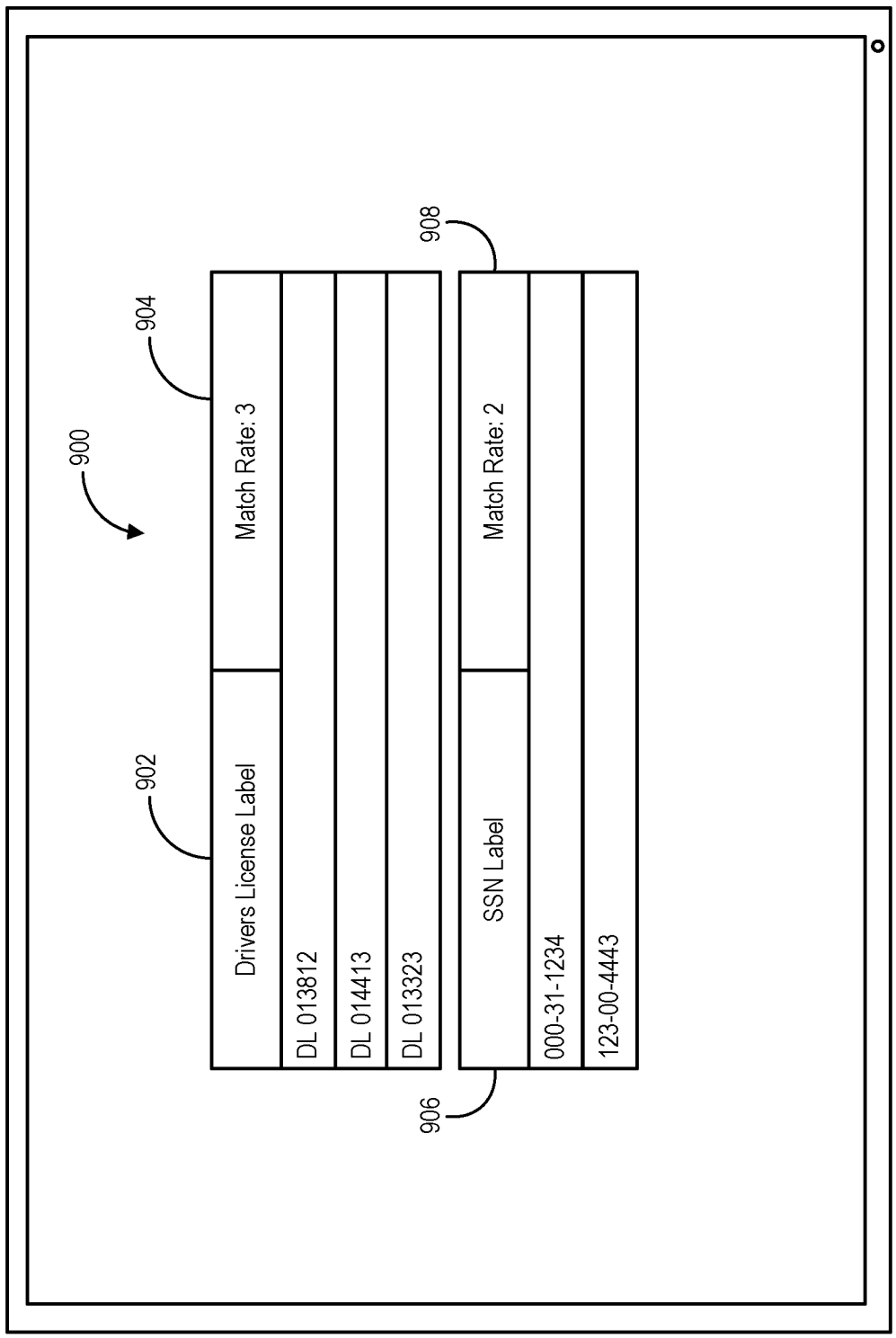
FIG. 9 illustrates an example of a graphical user interface displaying classifier labels for data elements in a digital dataset in accordance with one or more aspects.

As mentioned above, the classification priority management system 102 can provide information associated with data elements, classifiers, and classifier labels for display via graphical user interfaces of client devices. FIGS. 8-9 illustrate graphical user interfaces of client devices for initiating and managing classification requests for one or more datasets associated with an entity. For example, FIG. 8 illustrates an example of a graphical user interface for requesting data classification in accordance with one or more aspects.

As illustrated in FIG. 8, the client device can display a digital dataset 800 associated with a digital data source and/or an entity. In particular, the digital dataset 800 can include columns with different data elements (e.g., different data types such as identification, date, login). In some aspects, the client device can provide tools for updating information (e.g., data elements) within the dataset. For example, the classification priority management system 102, in response to input received via the client device, can cause the client device to add one or more columns/rows to the digital dataset, integrate information from other datasets to the digital dataset 800, remove one or more columns/rows from the dataset, and/or select various portions of the digital dataset 800.

Additionally, the client device can also display a classify element 804 for initiating a classification of the digital dataset 800. To illustrate, in response to determining a selection of one or more portions of the digital dataset 800, the classification priority management system 102 can apply the classifier model to the selected portions of the digital dataset 800. For example, as shown in FIG. 8, the classification priority management system 102 receives a selection of the identification column 802. As indicated in FIG. 8, the identification column 802 includes driver's license numbers and SSNs. Based on receiving the selection of the identification column 802 and receiving a selection of the classify element 804, the classification priority management system 102 can generate classifier labels for the driver's license data elements and the SSN data elements.

FIG. 9 illustrates an example of a graphical user interface displaying classifier labels for data elements in a digital dataset in accordance with one or more aspects. As indicated above, in some cases, the classification priority management system 102 can utilize a classifier model to generate classifier labels to a dataset and provide the generated classifier labels for labeled data elements and/or information related to the classifier labels and/or classifiers for display at the client device. FIG. 9 illustrates that the client device displays a classifier record 900 including additional information about the classifier label. For example, the classifier record 900 includes a driver's license label 902 for the labeled driver's license elements and an SSN label 906 for the labeled SSN data elements.

As further shown in FIG. 9, the classification priority management system 102 can provide for display the match rates for the classifier labels. In particular, FIG. 9 shows the classification priority management system 102 providing for display a first match rate 904 for the driver's license label 902 and a second match rate 908 for the SSN label. Additionally, in some aspects, the classification priority management system 102 can determine that the first match rate 904 is higher than the second match rate 908 and provide an indication of a priority order of the corresponding classifiers based on the corresponding match rates.

In one or more implementations, the classifier record 900 can provide other information for display. For example, the classifier record can include confidence scores for the classifier labels, sub-classifier labels, confidence scores for sub-classifier labels, etc. In some cases, where the classification priority management system 102 classifies an entire dataset that includes various data elements spanning different portions (e.g., columns, rows, etc.) of the digital dataset, the classification priority management system 102 can provide for display lists of classifiers that the classification priority management system 102 applied to specific portions (e.g., rows and/or columns) of the digital dataset. For example, the classifier record can provide for display a first group of classifiers that the classification priority management system 102 applied to a first column and a second group of different classifiers that the classification priority management system 102 applied to a second column.

In some aspects, the classification priority management system 102 can receive user input indicating the type of information to provide for display on the classifier record 900. For example, the classification priority management system 102 can receive user input requesting information (e.g., match rate, confidence scores, etc.) about the highest priority classifier. The classification priority management system 102 can utilize the information about the highest priority classifier to determine a priority order of classifiers or other data analysis information for applying to subsequent datasets.

Figure 10:
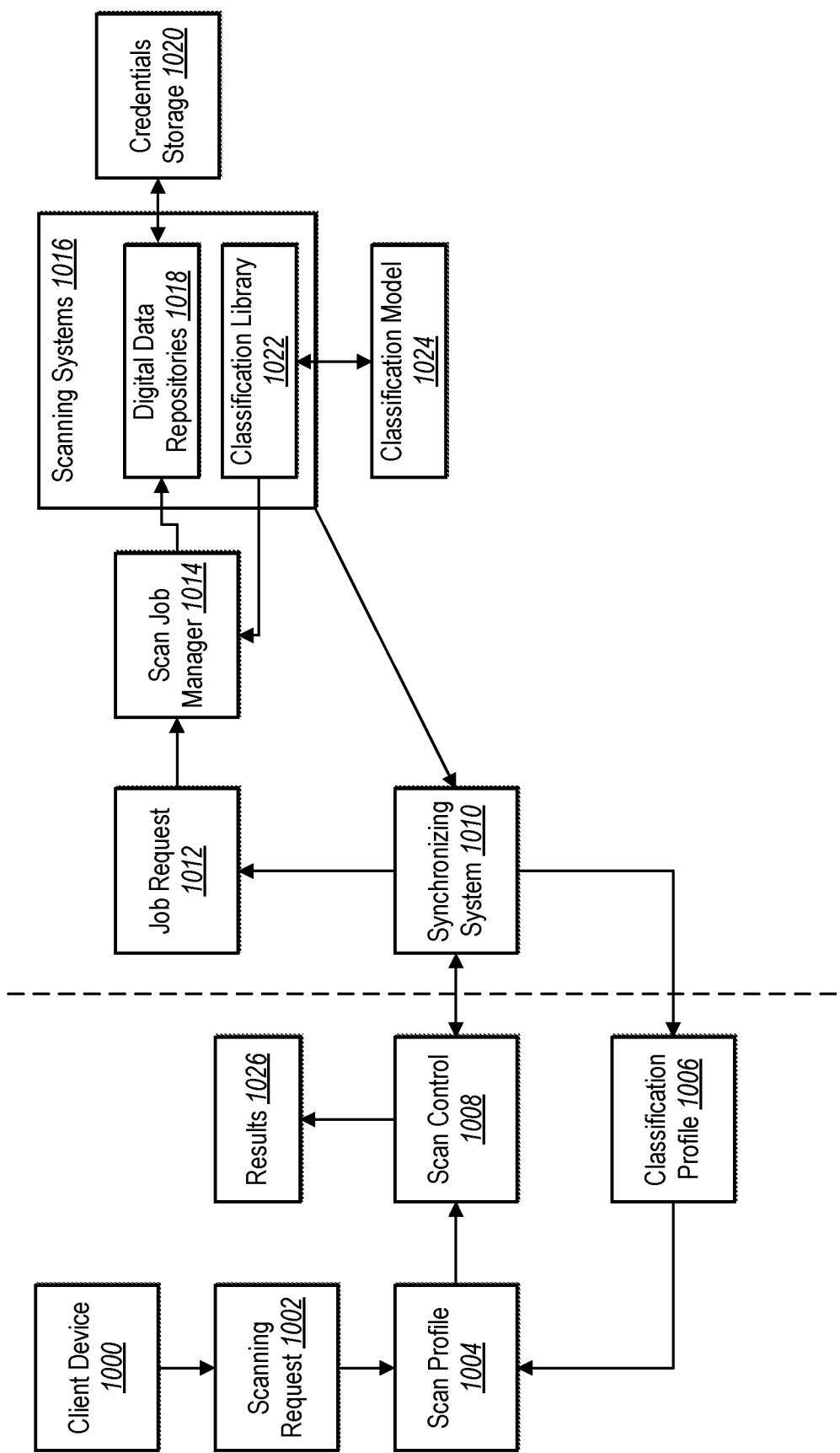
FIG. 10 illustrates an example of a system architecture of the classification priority management system executing a digital content scanning request in accordance with one or more aspects.

FIG. 10 illustrates an example architecture of the classification priority management system 102 performing operations to prioritize digital content items for scanning data associated with an entity. In one or more aspects, as illustrated, a first portion of the classification priority management system 102 operates at a cloud-based computing system. Additionally, a second portion of the classification priority management system 102 operates on premises (e.g., on one or more computing devices or servers associated with an entity).

In one or more aspects, the classification priority management system 102 communicates with a client device 1000, such as the client device 106 in FIG. 1, that initiates a scanning request 1002 to scan a dataset including a plurality of digital content items. In one or more aspects, the classification priority management system 102 determines a scan profile 1004 indicating one or more instructions for scanning the dataset. Furthermore, in some aspects, the scan profile 1004 includes (or is otherwise based on) a classification profile 1006 indicating priority levels for classified content from the dataset according to various downstream operations or digital data requirements. As also illustrated, in one or more aspects, the classification priority management system 102 provides the scan profile 1004 to a scan control 1008 that initiates the scanning request in connection with a portion of the classification priority management system 102 at computing devices of the entity.

As used herein, a "request" refers to a communication from a first computing device to a second computing device to perform a computing operation. In one or more aspects, an electronic request from a computing system includes a packet or message sent to the classification priority management system (e.g., via an API provided by the classification priority management system) and including processing instructions to perform one or more operations via one or more recipient processors and/or processing threads. For instance, an electronic request can include a request to extract data, classify data, modify data, or otherwise perform operations on data in one or more digital content items.

In additional aspects, the classification priority management system 102 utilizes the scan control 1008 to provide the scanning request 1002 with the scan profile 1004 to a synchronizing system 1010 at computing devices of the entity. For instance, the synchronizing system 1010 can continuously poll the scan control 1008 for new job requests (e.g., based on a state of a jobs table and/or timestamps of recent modifications). In some aspects, the synchronizing system 1010 provides the classification profile 1006 for including with the scan profile 1004. As illustrated in FIG. 10, the classification priority management system 102 deploys the synchronizing system 1010 (with additional components) at the computing device(s) of the entity behind network security controls (e.g., outside one or more firewalls) for accessing digital content items associated with the entity (e.g., at the computing devices or via one or more remote computing devices through the firewall(s)). For instance, to implement the architecture of FIG. 10 in the example depicted in FIG. 1, the synchronizing system 1010 (with additional components) could be installed on the third-party system 108 in order to have access to one or more digital data repositories 114 within a computing environment managed or accessed via one or more client devices 106. In this example, the digital document search system 102 includes the scan control 1008 and the synchronizing system 1010. The scan control 1008, installed on a server device 104, can only communicate with the synchronizing system 1010, installed on the third-party system 108, whereas the synchronizing system 1010 (with additional components) can perform various scanning and classification actions described herein.

In one or more aspects, the classification priority management system 102 utilizes the synchronizing system 1010 to compare a list of jobs included in a jobs table to determine one or more actions to take. For example, in response to determining that a scan job is present on the cloud-based system but not on the on-premises system, the synchronizing system 1010 initiates a new job. In response to determining that a scan job is present on the on-premises system but not on the cloud-based system, the synchronizing system 1010 cancels the job on the on-premises system. If the synchronizing system 1010 determines that a scan job is present on both systems, the synchronizing system 1010 determines a status of the scan job (e.g., completed, failed, or timed-out) and sends a status notification to the scan control 1008.

In one or more aspects, the classification priority management system 102 utilizes the synchronizing system 1010 to submit a job request 1012 to a scan job manager 1014 that manages the initiation and execution of scan jobs at the computing device(s) of the entity. For example, the classification priority management system 102 utilizes the scan job manager 1014 to communicate with scanning systems 1016 that scan digital data repositories 1018 including a dataset associated with the job request 1012. In additional aspects, the scanning systems 1016 include functions, scripts, or applications integrated with the digital data repositories 1018 to access and/or modify digital content items in the dataset. To illustrate, the scanning systems 1016 communicate with a database management system, a cloud storage devices or local storage devices, and/or storage accounts (e.g., utilizing credentials in a credentials storage 1020) to access digital content items. In some aspects, a listing of jobs received from the scan control 1008 can include job contexts for each scan job, including a scan profile identifier, a base label version (e.g., version of label definitions for pre-seeded labels available to all clients), and a custom label version (e.g., version of label definitions for custom labels specific to the entity).

In one or more aspects, the classification priority management system 102 executes a scan job through a pipeline of initiation, distribution, extraction and classification implemented by the scanning systems 1016 on the on-premises system, in which various events are emitted at different stages. Events can include examples such as those in the table below.

JOB_DISTRIBUTION_STARTED
JOB_CANCELLED
INCREMENT_JOB_SIZE
JOB_DISTRIBUTION_COMPLETED
JOB_DISTRIBUTION_FAILED
TASK_STARTED
UPDATE_TASK_SIZE
INCREMENT_PROCESSED_SIZE
TASK_COMPLETED
TASK_FAILED
TASK_CANCELLED

The scan job manager 1014 can subscribe to the events and manage the lifecycle of the jobs/tasks based on those events. Additionally, scanning systems 1016 can emit events upon completion of a particular phase of the scan job in a pipeline. In some aspects, the scan job manager 1014 updates a jobs repository to indicate which of these events have been emitted for a given scan job.

Furthermore, the scanning systems 1016 include a classification library 1022 that communicates with a classifier model 1024 (e.g., a named entity recognition model or other natural language processing model) to determine classifications (e.g., generate classifier labels) associated with data elements and/or the digital content items. A classification model 1324 can be implemented using one or more classification features described above with respect to FIGS. 2-7. In one or more aspects, the classification library 1022 also communicates with the scan job manager 1014 to obtain label definitions for labeling data elements and/or digital content items based on classifications generated by the classifier model 1024. Additionally, the classification library 1022 can determine the label definitions according to information from the classification profile 1006 and scan profile 1004.

In one or more aspects, in a scan job, a portion of the classification priority management system 102 implemented on-premises can apply one or more of the classifiers to batches of test data extracted by the scanning systems 1016. For example, the batch sizes can be based on a predefined batch size or a user-defined batch size. To illustrate, a configuration setting in the scan profile 1004 can indicate a specific number to sample and classify before initiating sampling and/or classification of additional rows. Thus, the classification priority management system 102 can determine a size of an initial/test dataset for use in determining a classification priority for classifying additional data. Additionally, results from a first batch can impact the confidence scores for classifier labels applied based on metadata extracted by the scanning systems 1016.

According to one or more aspects, in response to executing the job request 1012 utilizing the scanning systems 1016, the classification priority management system 102 utilizes the scanning systems 1016 to communicate results data to the synchronizing system 1010. For example, the scanning systems 1016 can provide a catalog and classification results corresponding to the digital content items indicated in the job request 1012 to the synchronizing system 1010. Additionally, the synchronizing system 1010 can provide the catalog and classification results to the scan control 1008, which provides the results 1026 for display and analysis via one or more client devices (e.g., the client device 1000).

In one or more aspects, the classification priority management system 102 provides the results 1026 in connection with one or more downstream operations. The downstream operations can involve one or more computing devices (e.g., the data processing system 116 or another device/system) performing operations to locate specific data types within the digital data repositories 1018, manage data from the digital data repositories 1018 via automated workflows, control access to data within the digital data repositories 1018, and/or facilitate deletion of data from the digital data repositories 1018. To illustrate, the classification priority management system 102 can detect (or can be used by a data processing system 116 to detect) a new type of data (e.g., personal data or sensitive data) stored in a particular data source, which triggers an automated workflow via a software platform, such as a platform hosted on or accessible via a data processing system 116, that includes or has access to the digital data repositories 1018. The automated workflow can include a series of user interfaces that are dynamically selected, generated, organized, or otherwise configured based on the subject matter of the workflow.

An example of the workflow includes a guided assessment (e.g., via one or more software modules of the platform) in which a series of user interfaces for collecting information (e.g., information regarding one or more of the data source, the discovered data, the use of the discovered data, etc.) are displayed to a user. The data processing system 116 can dynamically select, configure, and organize the series of interfaces based on the subject matter of the assessment (e.g., selecting interfaces presenting questions related to assessing privacy issues for certain discovered data types) and the data received via various interfaces in the workflow (e.g., skipping a question that is deemed no longer relevant based on an answer to an earlier question by omitting an interface that would present the irrelevant question).

In one or more aspects, the data processing system 116 can utilize a guided assessment to determine a sensitivity of a newly discovered data type, identify risks associated with the new data type, or develop a plan to manage risks associated with the new data type. Furthermore, the data processing system 116 may utilize the automated workflow to notify appropriate users of the new data type, implement appropriate security controls to protect the new data type, or monitor the new data type for potential security/privacy risks. Accordingly, the data processing system 116 can execute an assessment in response to one or more user inputs or automatically in response to detecting a data type in a particular source and execute an automated workflow to perform one or more computing operations based on the assessment and/or otherwise in connection with detecting the data type.

Additionally, or alternatively, the classification priority management system 102 can determine data types stored in one or more data sources, and the data processing system 116 can use the determined data types to implement purpose-based access controls. For instance, the data processing system 116 can determine that access to certain data may be subject to a particular purpose for accessing the data. To illustrate, a storage computing system may receive a request for credit card data or other financial data stored on the storage computing system to use in processing a purchase for a first data subject via a website.

In an additional example, the storage computing system may receive a second request for credit card data to use in displaying to a second data subject on the website to remind the second data subject of the credit card data previously saved to use in purchases. In such an example, the credit card data (e.g., entire credit card number) may not necessarily be needed for display to the second data subject, while a portion of the credit card data (e.g., a partially obfuscated or modified credit card number) may be sufficient for identification by the data subject. Therefore, the storage computing system, which can be included in or communicate with the data processing system 116, may determine specific access controls for the credit card data based on the different purposes associated with the requests for the credit card data. Such access controls may not only be applicable with respect to the entity requesting access to the data, but may also be applicable to how the data is displayed (e.g., modified) or used once accessed by the entity.

In either case, improved methods for classifying data contained in a storage system (i.e., determining that data source X includes credit card data) by the classification priority management system 102 facilitates the application of access-control policies (e.g., which implement certain purpose restrictions) that selectively modify datasets returned in response to a query so that the datasets are compliant with the purpose restrictions implemented via the access-control policies. For instance, a user of the computing environment that includes the data sources may have an account with a certain role that is assigned certain permissions. The permissions may allow access to certain types of data in certain types of data source for certain purposes associated with the role. Thus, the classification priority management system 102 facilitates purpose-based access control to data based on the classification applied to the data. This ensures that the personal data is only accessed by authorized users (e.g., user accounts) for authorized purposes.

Additionally or alternatively, the classification priority management system 102 assists in the automated detection and remediation of data retention policies. For example, the classification priority management system 102 detects (or is used by the data processing system 116 to detect) a certain type of data stored in a data source, such as personal data or other data considered sensitive for legal, regulatory, or policy reasons. The classification priority management system 102 also detects (or is used by the data processing system 116 to detect) one or more dates associated with the data (e.g., data of a document's creation, date contained within a document, etc.). The combination of the determined type of data plus other criteria, such as the date, indicates that retention of the data constitutes a policy violation, such as a data retention policy. A software program or suite that includes the data processing system 116 or that communicates with the data processing system 116 (e.g., via an integration between the software program and the data processing system 116) can automatically delete (or automatically prompt a user to delete) the data that violates the policy.

For example, the data processing system 116 may determine that a data source contains personal data that was created more than 7 years ago. A software program that has access to the data processing system 116 (e.g., via an integration between the software program and the data processing system 116) may automatically delete the personal data, as it is no longer required to be retained under the organization's data retention policy. The automatic deletion may be automated (e.g., without requiring any user intervention) via the data processing system 116 or partially automated (e.g., by presenting a user with a prompt or screen identifying the data to be deleted and proceeding with the deletion upon receiving the user's confirmation).

Although FIG. 10 illustrates that the classification priority management system 102 utilizes a plurality of components within a cloud-based system and a plurality of components at on premises devices of a single entity, the classification priority management system 102 can implement data prioritization scanning for a plurality of entities. To illustrate, the classification priority management system 102 can integrate separate synchronizing systems, scan job managers, and scanning systems at computing devices of each entity that issues a scanning request to the components within the cloud-based system. For instance, the classification priority management system 102 can utilize the scan control 1008 to manage scanning requests for a plurality of entities and communicate with a plurality of separate synchronizing systems at different computing devices of the different entities.

Additionally, as mentioned above, the classification priority management system 102 can utilize a first set of operations to manage a scan profile 1004 and a scan control 1008 for implementing a scanning request 1002 and providing results 1026 of the scanning request via a client device 1000 at a first computing system (e.g., a cloud-based computing system). Additionally, the classification priority management system 102 can utilize a second set of operations to manage a synchronizing system 1010, a scan job manager 1014, and scanning systems 1016 to scan data in digital data repositories 1018 and classify the data utilizing a classifier model 1024 at a second computing system (e.g., one or more computing devices or servers at one or more locations of an entity). In some aspects, the classification priority management system 102 utilizes one or more other configurations, such that one or more portions described above in connection with the first computing system are instead part of the second computing system, or vice-versa. Thus, the classification priority management system 102 can utilize several different computing devices (e.g., cloud-based devices or on premises devices) to perform various operations associated with classifying and routing digital content items. In additional aspects, the classification priority management system 102 performs one or more operations described herein by utilizing one or more software applications at one or more computing devices to generate instructions that cause one or more additional computing devices to perform one or more computing operations. As an example, a cloud-based computing application classifies a data element and/or digital content item by generating instructions that cause a server on premises of an entity to utilize a classifier model to generate a classifier label for the data element.

In one or more aspects, the components deployed on the computing device(s) of the entity are part of a discovery agent for detecting data sources, datasets, and data types via data extraction and classification. The classification priority management system can utilize the discovery agent to identify a data source, scan the data source, tag the data source (e.g., tag data in the data source), and send and classify the respective set of data in accordance with the tagged data. In some instances, by utilizing the discovery agent, the classification priority management system generates metadata associated with the digital content items to indicate results of the scanning and classification by the discovery agent. Additionally, the discovery agent can include one or more virtual machines for storing data and/or including/executing scanning operations or classifying operations.

In additional aspects, the classification priority management system 102 configures the discovery agent to reduce an impact on a performance of the computing devices, servers, etc. For instance, the classification priority management system can configure the discovery agent to utilize bandwidth throttling techniques, such as by limiting scanning and other processing steps to non-peak times. The classification priority management system can also configure the discovery agent to limit performance of such operations to backup applications and data storage locations (e.g., by using sampling techniques to decrease a number of files to scan during the data discovery process).

In additional aspects, the classification priority management system 102 generates data objects for each dataset or group of data in a digital data repository. For example, in response to determining that a particular set of data is a training dataset associated with a particular artificial intelligence model, the classification priority management system can generate a data object for the dataset. The classification priority management system can also assign attributes to the data object based on attributes of the dataset. To illustrate, the classification priority management system can store information with the data object indicating a purpose of the dataset, a priority level or data type of the dataset, or one or more other data components associated with the dataset (e.g., an artificial intelligence model). The classification priority management system can also classify the data object associated with the dataset into a corresponding category (e.g., based on the priority level or data type).

Figure 11:
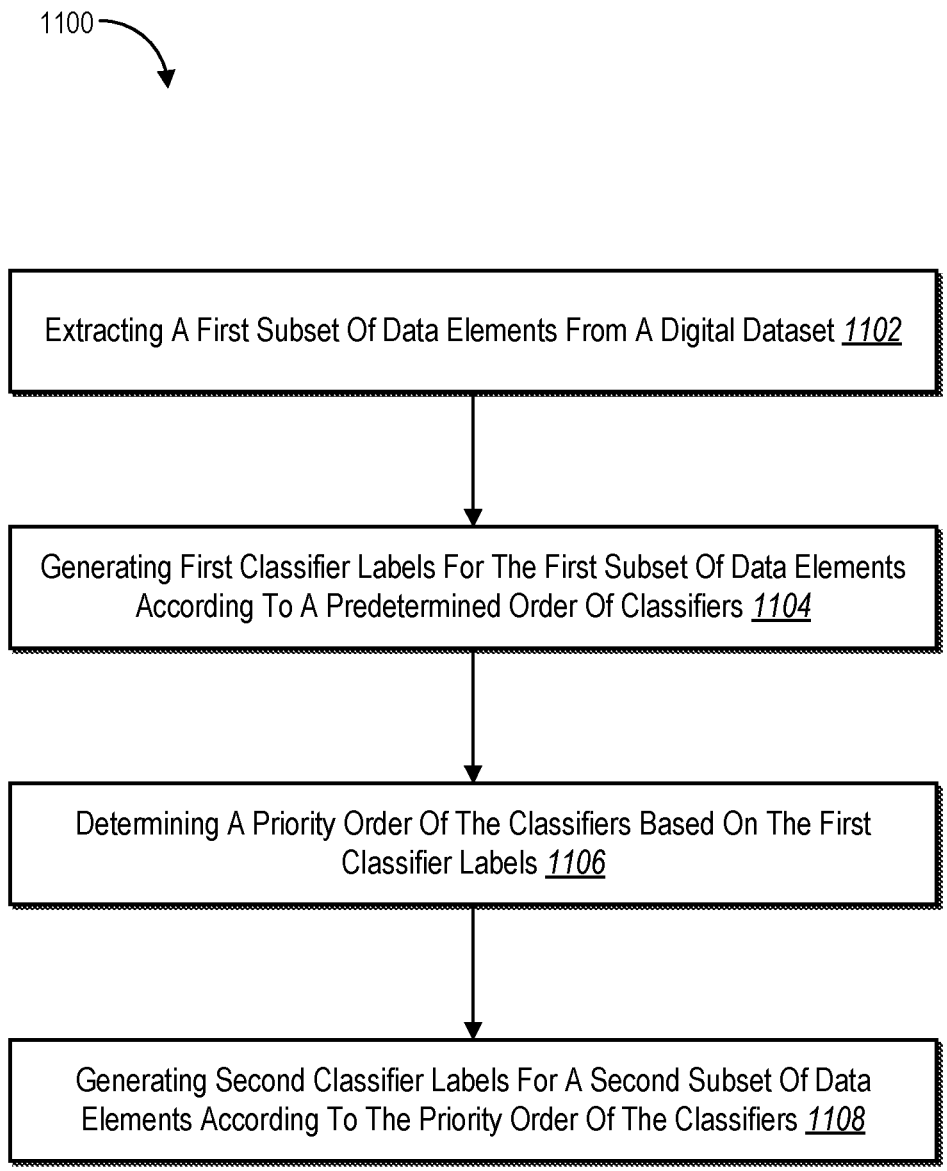
FIG. 11 illustrates an example flowchart of a method for determining a priority order of classifiers in a classifier model based on first classifier labels in accordance with one or more aspects.

Turning now to FIG. 11, this figure shows a flowchart of a process of determining a priority order of classifiers. While FIG. 11 illustrates acts according to one aspect, alternative aspects may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further aspects, a system can perform the acts of FIG. 11. One or more of these aspects can be implemented using a classification priority management system described in one or more of the examples above.

The process 1100 includes an act 1102 of extracting a first subset of data elements from a digital dataset. More specifically, the act 1102 includes extracting, by processing hardware, a first subset of data elements from a digital dataset stored at a digital data source. In some cases, the act 1102 includes extracting a set of data elements from a digital dataset stored at the digital data source. In one or more aspects, act 1102 is implemented using one or more examples described above with respect to FIGS. 1-3, such as by using the classification priority management system to implement the extracting operations. The process 1100 also includes an act 1104 of generating first classifier labels for the first subset of data elements according to a predetermined order of classifiers. In one or more aspects, act 1104 is implemented by a classification priority management system using one or more examples described above with respect to FIGS. 3 and 6. Additionally, the process 1100 includes an act 1106 of determining a priority order of the classifiers based on the first classifier labels. In one or more aspects, act 1106 is implemented by a classification priority management system using one or more examples described above with respect to FIGS. 2, 3, and 6. Moreover, the process 1100 includes an act 1108 of generating second classifier labels for a second subset of data elements according to the priority order of the classifiers. In one or more aspects, act 1108 is implemented by a classification priority management system using one or more examples described above with respect to FIGS. 2 and 3.

In one or more implementations, the process 1100 includes extracting a first subset of data elements from a digital dataset stored at a digital data source. The process 1100 includes generating, by the processing hardware utilizing a classifier model, first classifier labels for the first subset of data elements of the digital dataset according to a predetermined order of classifiers of the classifier model. In some cases, the process 1100 further includes determining, a priority order of the classifiers of the classifier model according to the first classifier labels of the first subset of data elements. The process 1100 also includes generating, by the processing hardware utilizing the classifier model, second classifier labels for a second subset of data elements from the digital dataset stored at the digital data source according to the priority order of the classifiers of the classifier model.

In one or more cases, the process 1100 can include an act where generating the first classifier labels comprises determining a sub-classifier set (e.g., a set of one or more sub-classifiers) of a classifier of the classifier model.

The process 1100 can include generating first sub-classifier labels for the first subset of data elements of the digital dataset according to an additional predetermined order of sub-classifier set of the classifier of the classifier model. The process 1100 also includes determining an additional priority order of sub-classifier set of the classifier of the classifier model according to the first sub-classifier labels of the first subset of data elements.

The process 1100 can include an act where generating the first classifier labels for the first subset of data elements further comprises determining a confidence score for a relationship between a first data element of the first subset of data elements and a first classifier from the classifiers of the classifier model. The process 1100 can also include based on the confidence score exceeding a confidence score threshold, applying the first classifier to the first subset of data elements.

The process 1100 can further include an act where determining the confidence score comprises determining a distance between the first data element of the first subset of data elements and the first classifier.

The process 1100 includes generating the first classifier labels for the first subset of data elements by applying the predetermined order of classifier models utilizing the classifier model. The process 1100 can include determining match rates between the classifiers and the first subset of data elements. The process 1100 can also include based on the match rates between the classifiers and the first subset of data elements, updating the predetermined order of classifiers.

In one or more aspects, the process 1100 can include generating the first classifier labels for the first subset of data elements by applying a first classifier and a second classifier according to the predetermined order of classifiers. The process 1100 can also include determining a first match rate between the first classifier and the first subset of data elements and a second match rate between the second classifier and the first subset of data elements. The process 1100 can further include determining that the second match rate of the second classifier exceeds the first match rate of the first classifier. The process 1100 includes based on the second match rate of the second classifier exceeding the first match rate of the first classifier, updating the priority order of the classifiers to prioritize the second classifier over the first classifier.

In one or more cases, the process 1100 includes identifying an unlabeled data element from the first subset of data elements. The process 1100 can further include generating, by the processing hardware utilizing the classifier model, a third classifier label for the unlabeled data element by applying an additional classifier to the unlabeled data element. Additionally, the process 1100 can include based on a confidence score for a relationship between the unlabeled data element and the additional classifier, adding the additional classifier to the classifiers of the classifier model.

The process 1100 can include extracting a set of data elements from a digital dataset stored at the digital data source. The process 1100 can also include generating an ordered set of classifiers for a classifier model. In certain aspects, the process 1100 further includes generating, utilizing the classifier model, classifier labels for the set of data elements from the digital dataset by applying the ordered set of classifiers to the set of data elements. Moreover, the process 1100 can include determining, based on the classifier labels, classifier label frequencies for the classifiers of the ordered set of classifiers. In one or more cases, the process 1100 includes determining, based on the classifier label frequencies, an updated ordered set of classifiers.

The process 1100 can include generating, utilizing the classifier model, additional data element classification labels for an additional set of data elements from the digital dataset stored at the digital data source by applying the updated ordered set of classifiers from the classifier model to the additional set of data elements.

In some aspects, the process 1100 can include determining, based on a distance between a data element of the set of data elements and classifiers from the ordered set of classifiers, confidence scores for relationships between the data element from the set of data elements and the classifiers from the ordered set of classifiers. The process 1100 can further include determining a classifier with a highest confidence score corresponding to the data element of the set of data elements. The process 1100 can also include generating a classifier label for the data element by utilizing the classifier model to apply the classifier with the highest confidence score to the data element of the set of data elements.

The process 1100 can include determining a highest priority classifier by identifying a classifier with a highest classifier label frequency. In some cases, the process 1100 further includes determining the updated ordered set of classifiers by utilizing the classifier model to apply the highest priority classifier before applying remaining classifiers in the updated ordered set of classifiers.

The process 1100 can also include determining, utilizing the classifier model, an ordered set of sub-classifiers corresponding to a first classifier of the ordered set of classifiers. The process 1100 can further include generating, utilizing the classifier model, sub-classifier labels for the set of data elements from the digital dataset by applying the ordered set of sub-classifiers to the set of data elements.

Additionally, the process 1100 can include determining confidence scores for relationships between a first data element of the set of data elements and classifiers from the ordered set of classifiers. The process 1100 can also include based on the confidence scores for the relationships between the first data element of the set of data elements and the classifiers from the ordered set of classifiers not meeting a confidence score threshold, utilize the classifier model to apply a second set of ordered classifiers to the first data element.

The process 1100 can include receiving user input requesting classifier labels for the digital dataset stored at the digital data source. The process 1100 can further include in response to the user input, generate, utilizing the classifier model, the classifier labels for the set of data elements from the digital dataset by utilizing the classifier model to apply the ordered set of classifiers to the set of data elements.

Aspects of the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, the subject matter defined in the appended claims is not necessarily limited to the described features or acts described above. Rather, the described features and acts are disclosed as example forms of implementing the claims.

This disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
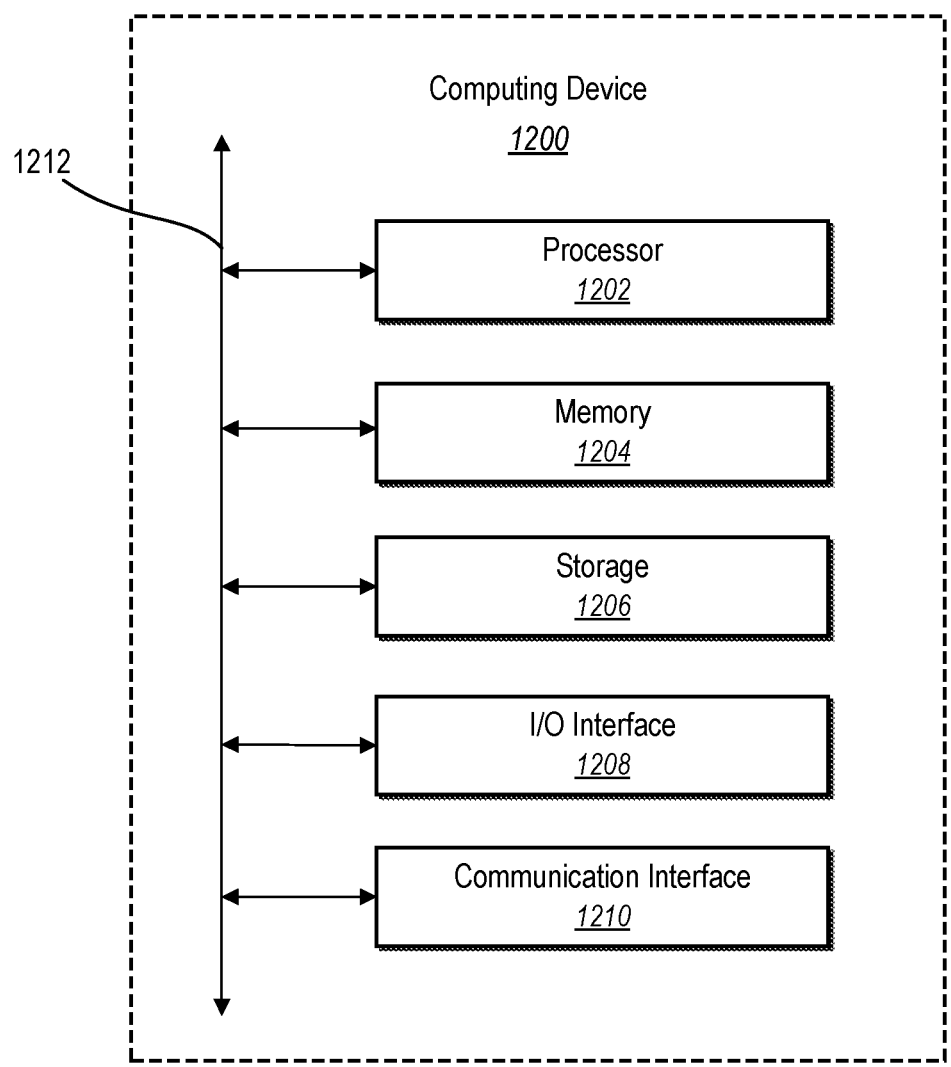
FIG. 12 illustrates an example of a computing device in accordance with one or more aspects.

FIG. 12 illustrates a block diagram of exemplary computing device 1200 that may be configured to perform one or more of the processes described above. One or more computing devices such as the computing device 1200 may implement the system(s) of FIG. 1. The computing device 1200 can comprise a processor 1202, a memory 1204, a storage device 1206, an I/O interface 1208, and a communication interface 1210, which may be communicatively coupled by way of a communication infrastructure 1212. In certain aspects, the computing device 1200 can include fewer or more components than those shown in FIG. 12. Components of the computing device 1200 shown in FIG. 12 will now be described in additional detail.

In one or more aspects, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   extracting, by processing hardware, a first subset of data elements from a digital dataset stored at a digital data source;
   determining a confidence score for a relationship between a first data element of the first subset of data elements and a first classifier from the classifiers of a classifier model;
   based on the confidence score exceeding a confidence score threshold, applying the first classifier to the first subset of data elements to generate first classifier labels for the first subset of data elements of the digital dataset;
   determining, by the processing hardware, a priority order of the classifiers of the classifier model according to the first classifier labels of the first subset of data elements; and
   generating, by the processing hardware utilizing the classifier model, second classifier labels for a second subset of data elements from the digital dataset stored at the digital data source according to the priority order of the classifiers of the classifier model.

2. The computer-implemented method of claim 1, wherein generating the first classifier labels comprises determining one or more sub-classifiers of a classifier of the classifier model.

3. The computer-implemented method of claim 2, further comprising:
   generating, by the processing hardware, utilizing the classifier model, first sub-classifier labels for the first subset of data elements of the digital dataset according to an additional predetermined order of the one or more sub-classifiers of the classifier of the classifier model; and
   determining, by the processing hardware, an additional priority order of the one or more sub-classifiers of the classifier of the classifier model according to the first sub-classifier labels of the first subset of data elements.

4. The computer-implemented method of claim 1, wherein determining the confidence score comprises determining a distance between the first data element of the first subset of data elements and the first classifier.

5. The computer-implemented method of claim 1, wherein determining, by the processing hardware, the priority order of the classifiers of the classifier model further comprises:
generating the first classifier labels for the first subset of data elements by applying the predetermined order of classifier models utilizing the classifier model;
determining match rates between the classifiers and the first subset of data elements; and
based on the match rates between the classifiers and the first subset of data elements, updating the predetermined order of classifiers.

6. The computer-implemented method of claim 5, further comprising:
generating the first classifier labels for the first subset of data elements by applying a first classifier and a second classifier according to the predetermined order of classifiers;
determining a first match rate between the first classifier and the first subset of data elements and a second match rate between the second classifier and the first subset of data elements;
determining that the second match rate of the second classifier exceeds the first match rate of the first classifier; and
based on the second match rate of the second classifier exceeding the first match rate of the first classifier, updating the priority order of the classifiers to prioritize the second classifier over the first classifier.

7. The computer-implemented method of claim 1, further comprising:
identifying an unlabeled data element from the first subset of data elements,
generating, by the processing hardware utilizing the classifier model, a third classifier label for the unlabeled data element by applying an additional classifier to the unlabeled data element; and
based on a confidence score for a relationship between the unlabeled data element and the additional classifier, adding the additional classifier to the classifiers of the classifier model.

8. A system comprising:
one or more non-transitory computer readable media comprising a digital data source; and
processing hardware configured to cause the system to:
extract a set of data elements from a digital dataset stored at the digital data source;
generate an ordered set of classifiers for a classifier model;
determine confidence scores for relationships between a first data element of the set of data elements and classifiers from the ordered set of classifiers;
generate, utilizing the classifier model based on the confidence scores for the relationships between the first data element of the set of data elements and the classifiers from the ordered set of classifiers, classifier labels for the set of data elements from the digital dataset by applying the ordered set of classifiers to the set of data elements;
determine, based on the classifier labels, classifier label frequencies for the classifiers of the ordered set of classifiers; and
determine, based on the classifier label frequencies, an updated ordered set of classifiers.

9. The system of claim 8, wherein the processing hardware is further configured to cause the system to generate, utilizing the classifier model, additional data element classification labels for an additional set of data elements from the digital dataset stored at the digital data source by applying the updated ordered set of classifiers from the classifier model to the additional set of data elements.

10. The system of claim 9, wherein the processing hardware is further configured to cause the system to:
determine, based on a distance between a data element of the set of data elements and classifiers from the ordered set of classifiers, confidence scores for relationships between the data element from the set of data elements and the classifiers from the ordered set of classifiers;
determine a classifier with a highest confidence score corresponding to the data element of the set of data elements; and
generate a classifier label for the data element by utilizing the classifier model to apply the classifier with the highest confidence score to the data element of the set of data elements.

11. The system of claim 10, wherein the processing hardware is further configured to cause the system to:
determine a highest priority classifier by identifying a classifier with a highest classifier label frequency; and
determine the updated ordered set of classifiers by utilizing the classifier model to apply the highest priority classifier before applying remaining classifiers in the updated ordered set of classifiers.

12. The system of claim 8, wherein the processing hardware is further configured to cause the system to:
determine, utilizing the classifier model, an ordered set of sub-classifiers corresponding to a first classifier of the ordered set of classifiers; and
generate, utilizing the classifier model, sub-classifier labels for the set of data elements from the digital dataset by applying the ordered set of sub-classifiers to the set of data elements.

13. The system of claim 8, wherein the processing hardware is further configured to cause the system to:
based on the confidence scores for the relationships between the first data element of the set of data elements and the classifiers from the ordered set of classifiers not meeting a confidence score threshold, utilize the classifier model to apply a second set of ordered classifiers to the first data element.

14. The system of claim 8, wherein the processing hardware is further configured to cause the system to:
receive user input requesting classifier labels for the digital dataset stored at the digital data source; and
in response to the user input, generate, utilizing the classifier model, the classifier labels for the set of data elements from the digital dataset by utilizing the classifier model to apply the ordered set of classifiers to the set of data elements.

15. A non-transitory computer readable medium comprising instructions that, when executed by at least one computer processor, cause the at least one computer processor to:
extract, by processing hardware, a first subset of data elements from a digital dataset stored at a digital data source;
determine a confidence score for a relationship between a first data element of the first subset of data elements and a first classifier from the classifiers of a classifier model;
based on the confidence score exceeding a confidence score threshold, apply the first classifier to the first subset of data elements to first classifier labels for the first subset of data elements of the digital dataset;

determine, by the processing hardware, a priority order of the classifiers of the classifier model according to the first classifier labels of the first subset of data elements; and generate, by the processing hardware utilizing the classifier model, second classifier labels for a second subset of data elements from the digital dataset stored at the digital data source according to the priority order of the classifiers of the classifier model.

16. The non-transitory computer readable medium of claim 15, wherein the at least one computer processor is further configured to generate the first classifier labels comprises determining one or more sub-classifiers of a classifier of the classifier model.

17. The non-transitory computer readable medium of claim 16, further comprising instructions that, when executed by the at least one computer processor cause the at least one computer processor to:

generate, by the processing hardware, utilizing the classifier model, first sub-classifier labels for the first subset of data elements of the digital dataset according to an additional predetermined order of the one or more sub-classifiers of the classifier of the classifier model; and determine, by the processing hardware, an additional priority order of the one or more sub-classifiers of the classifier of the classifier model according to the first sub-classifier labels of the first subset of data elements.

18. The non-transitory computer readable medium of claim 1, wherein the at least one computer processor is further configured to, determine the confidence score by determining a distance between the first data element of the first subset of data elements and the first classifier.

19. The non-transitory computer readable medium of claim 15, wherein the at least one computer processor is further configured to, determine the priority order of the classifiers of the classifier model by:

generating the first classifier labels for the first subset of data elements by applying the predetermined order of classifier models utilizing the classifier model;

determining match rates between the classifiers and the first subset of data elements; and based on the match rates between the classifiers and the first subset of data elements, updating the predetermined order of classifiers.

20. The non-transitory computer readable medium of claim 19, wherein the at least one computer processor is further configured to:

generate the first classifier labels for the first subset of data elements by applying a first classifier and a second classifier according to the predetermined order of classifiers;

determine a first match rate between the first classifier and the first subset of data elements and a second match rate between the second classifier and the first subset of data elements;

determine that the second match rate of the second classifier exceeds the first match rate of the first classifier; and based on the second match rate of the second classifier exceeding the first match rate of the first classifier, update the priority order of the classifiers to prioritize the second classifier over the first classifier.

* * * * *